United States Patent
McClements, IV

(10) Patent No.: US 10,706,482 B1
(45) Date of Patent: **\*Jul. 7, 2020**

(54) PARALLEL ECHO VERSION OF MEDIA CONTENT FOR COMMENT CREATION AND DELIVERY

(71) Applicant: Quib, Inc., Boulder, CO (US)

(72) Inventor: James Burns McClements, IV, Boulder, CO (US)

(73) Assignee: Quib, Inc., Boulder, CO (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/588,364

(22) Filed: May 5, 2017

Related U.S. Application Data

(63) Continuation of application No. 13/323,615, filed on Dec. 12, 2011, now Pat. No. 9,646,352.

(60) Provisional application No. 61/432,395, filed on Jan. 13, 2011, provisional application No. 61/421,945, filed on Dec. 10, 2010, provisional application No.
(Continued)

(51) Int. Cl.
| | |
|---|---|
| *G06Q 50/00* | (2012.01) |
| *G06Q 10/10* | (2012.01) |
| *G06F 16/78* | (2019.01) |
| *G06F 40/169* | (2020.01) |
| *G11B 27/34* | (2006.01) |
| *G11B 27/034* | (2006.01) |
| *G06Q 30/06* | (2012.01) |
| *H04N 21/4722* | (2011.01) |
| *H04L 29/08* | (2006.01) |
| *G06F 3/0484* | (2013.01) |

(52) U.S. Cl.
CPC .......... *G06Q 50/01* (2013.01); *G06Q 10/101* (2013.01); *G06Q 30/0643* (2013.01); *G11B 27/034* (2013.01); *G11B 27/34* (2013.01); *G06F 3/0484* (2013.01); *G06F 16/7867* (2019.01); *G06F 40/169* (2020.01); *H04L 67/08* (2013.01); *H04N 21/4722* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,600,775 A | * | 2/1997 | King | .......... H04N 7/15 715/203 |
| 2005/0132288 A1 | * | 6/2005 | Kirn | .......... H04L 12/1827 715/700 |

(Continued)

*Primary Examiner* — Nhat Huy T Nguyen
(74) *Attorney, Agent, or Firm* — Holland & Hart, LLP

(57) ABSTRACT

Methods, systems, and devices are described for associating comments with playback of media content. At an input device, a parallel echo version of media content being played on a second device is provided, and a selection is received of a portion of the parallel echo version of the media content. A comment associated with the selected portion of the parallel echo version of the media content is received, and the received comment is associated with a portion of the media content associated with the selected portion of the parallel echo version. At an output device, a parallel echo version of media content being played on a second device is provided, a current point in the parallel echo version of the media content is determined, and an indicator of a comment associated with a point in the media content corresponding to the current point in the parallel echo version is displayed.

18 Claims, 17 Drawing Sheets

Related U.S. Application Data

61/432,397, filed on Jan. 13, 2011, provisional application No. 61/439,189, filed on Feb. 3, 2011, provisional application No. 61/439,196, filed on Feb. 3, 2011.

(56) References Cited

U.S. PATENT DOCUMENTS

| | | | | |
|---|---|---|---|---|
| 2007/0266304 A1* | 11/2007 | Fletcher | ................ | G06F 17/241 715/230 |
| 2008/0028323 A1* | 1/2008 | Rosen | .................... | G06Q 10/10 715/752 |
| 2010/0201789 A1* | 8/2010 | Yahagi | ................. | H04N 13/139 348/51 |
| 2011/0047247 A1* | 2/2011 | Katz | ....................... | G06F 3/165 709/219 |
| 2016/0295268 A1* | 10/2016 | Lanier | ................. | G06Q 20/102 |

\* cited by examiner

PARALLEL ECHO VERSION OF MEDIA CONTENT FOR COMMENT CREATION AND DELIVERY

CROSS REFERENCES

The present application is a continuation of U.S. application Ser. No. 13/323,615, filed Dec. 12, 2012, entitled "PARALLEL ECHO VERSION OF MEDIA CONTENT FOR COMMENT CREATION AND DELIVERY." U.S. application Ser. No. 13/323,615 claims priority to the following patent applications: U.S. Provisional Patent Application No. 61/421,945, filed Dec. 10, 2010, entitled "DYNAMIC MULTIMEDIA COMMENT AND DISPLAY ARCHITECTURE", U.S. Provisional Patent Application No. 61/432,395, filed Jan. 13, 2011, entitled "SYSTEM, DEVICE, AND INTERFACE ARCHITECTURE FOR COMMENT CREATION"; U.S. Provisional Patent Application No. 61/432,397, filed Jan. 13, 2011, entitled "SCREEN LOCATION COMMENT ARCHITECTURE"; U.S. Provisional Patent Application No. 61/439,189, filed Feb. 3, 2011, entitled "USER SELECTABLE COMMENT FILTER AND RELATED ARCHITECTURE"; and U.S. Provisional Patent Application No. 61/439,196, filed Feb. 3, 2011, entitled "COMMENT DELIVERY ARCHITECTURE", each of which is incorporated herein in its entirety for all purposes.

The present application is further related to U.S. patent application Ser. No. 13/323,610, filed concurrently on Dec. 12, 2011, entitled "ASSOCIATING COMMENTS WITH PLAYBACK OF MEDIA CONTENT"; U.S. patent application Ser. No. 13/323,614, filed concurrently on Dec. 12, 2011, entitled "RECOGNITION LOOKUPS FOR SYNCHRONIZATION OF MEDIA PLAYBACK WITH COMMENT CREATION AND DELIVERY"; U.S. patent application Ser. No. 13/323,619, filed concurrently on Dec. 12, 2011, entitled "ASSOCIATION OF COMMENTS WITH SCREEN LOCATIONS DURING MEDIA CONTENT PLAYBACK"; U.S. patent application Ser. No. 13/323,624, filed concurrently on Dec. 12, 2011, entitled "MEDIA CONTENT CLIP IDENTIFICATION AND COMBINATION ARCHITECTURE"; and U.S. patent application Ser. No. 13/323,622, filed concurrently on Dec. 12, 2011, entitled "COMMENT DELIVERY AND FILTERING ARCHITECTURE", each of which is incorporated herein in its entirety for all purposes.

BACKGROUND

The present invention relates to the creation, storage, and distribution of commentary on media content.

Most people interact quite regularly with recorded media content, such as videos, music, books, and the spoken word. Modern society leans heavily on recorded media content to provide both entertainment and education. With the recent proliferation of portable media players, smartphones, tablet computers and the like, the demand for recorded media content continues to increase.

For many people, social interaction enhances the experience of viewing or listening to recorded media content. For example, the reactions and opinions of one's peers with respect to a certain film may increase that person's enjoyment of the film. In other examples, the perspective of a filmmaker or critic with a unique understanding of a particular film may, when shared, add greater meaning to one's perception of the film.

Often, a person consuming recorded media content may wish to share comments with other consumers of the recorded media content at present or in the future. Additionally, it may be desirable to incorporate comments generated by others with regard to specific portions of recorded media content into the experience of viewing and/or listening to the media content.

SUMMARY

Methods, systems, and devices are described for associating comments with playback of media content.

In a first set of embodiments, a method of associating comments with playback of media content includes providing at a first device a parallel echo version of media content being played on a second device, receiving a selection of a portion of the parallel echo version of the media content at the first device, receiving a comment associated with the selected portion of the parallel echo version of the media content at the first device, and associating the received comment with a portion of the media content associated with the selected portion of the parallel echo version of the media content.

In a second set of embodiments, an apparatus for associating comments with playback of media content includes an echo version module, a selection receiving module, a comment receiving module, and an association module. The echo version module is configured to provide a parallel echo version of media content being played on a second device separate from the apparatus. The selection receiving module is configured to receive a selection of a portion of the parallel echo version of the media content. The comment receiving module is configured to receive a comment associated with the selected portion of the parallel echo version of the media content. The association module is configured to associate the received comment with a portion of the media content associated with the selected portion of the parallel echo version of the media content.

In a third set of embodiments, a method of associating comments with playback of media content includes providing at a first device a parallel echo version of media content being played on a second device, determining a current point in the parallel echo version of the media content provided at the first device, and displaying at the first device an indicator of a comment associated with a point in the media content corresponding to the current point in the parallel echo version of the media content provided at the first device

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Methods, systems, and devices are described for associating comments with playback of media content. In the present description, an input device provides a parallel echo version of media content being played on a second device, and receives a selection of a portion of the parallel echo version. A comment associated with the selected portion of the parallel echo version of the media content is received, and the received comment is associated with a portion of the media content associated with the selected portion of the parallel echo version.

An output device provides a parallel echo version of media content being played on a second device, and determines a current point in the parallel echo version of the media content. An indicator of a comment associated with a point in the media content corresponding to the current point in the parallel echo version is displayed at the output device. In certain examples, the functions of the input device and the output device may be performed by a single user device.

This description provides examples, and is not intended to limit the scope, applicability or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
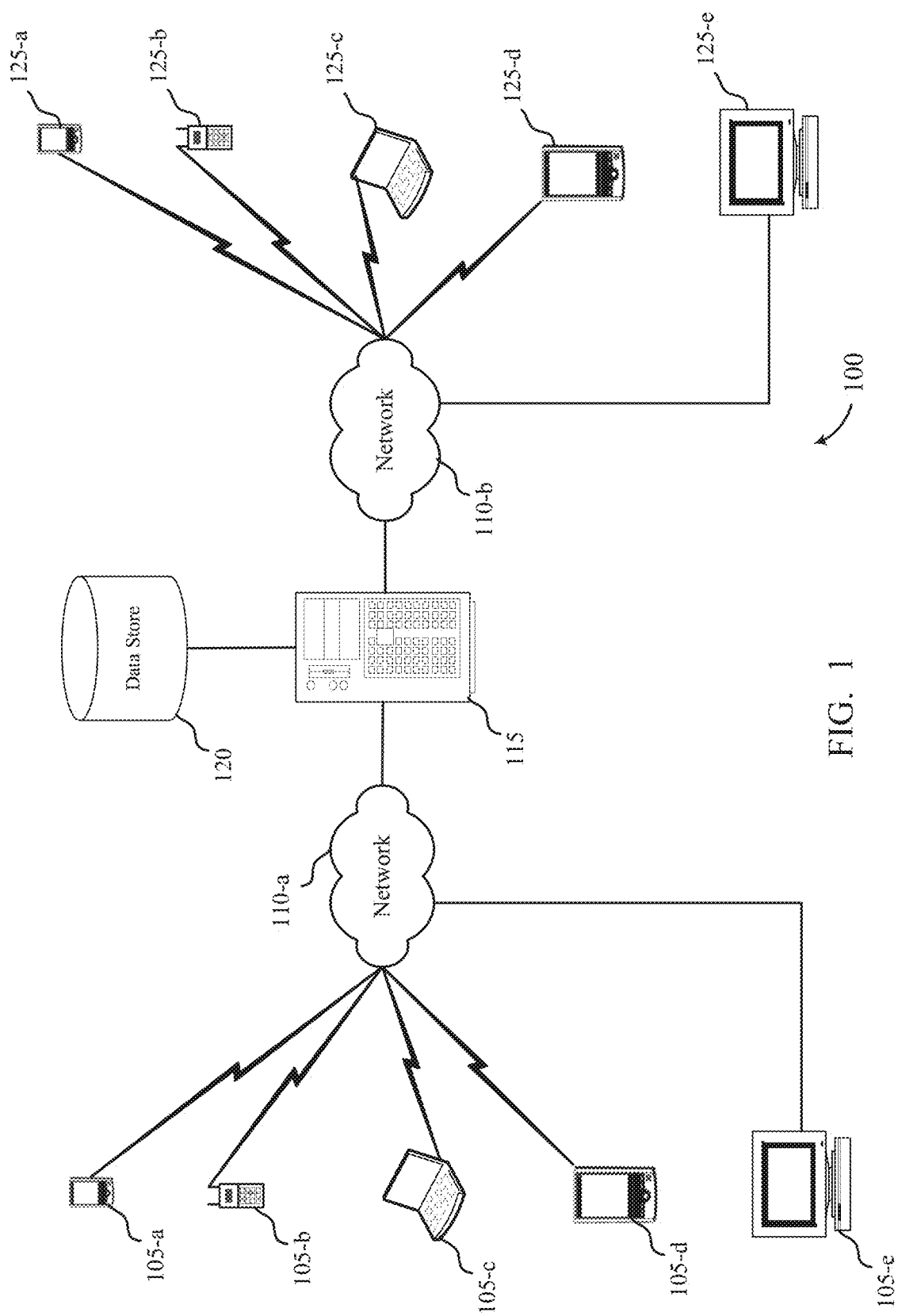
FIG. 1 is a block diagram of an example system including components configured according to various embodiments of the invention.

Systems, devices, methods, and software are described for the creation of commentary on multimedia and other information content. In one set of embodiments, shown in FIG. 1, a system 100 includes input devices 105 (e.g., mobile device 105-*a*, mobile phone 105-*b*, laptop 105-*c*, tablet 105-*d*, computer 105-*e*, or other computing devices), networks 110, central server computer system 115, data store 120, and output devices 125 (e.g., mobile device 125-*a*, mobile phone 125-*b*, laptop 125-*c*, tablet 125-*d*, computer 125-*e*, or other computing devices). Each of these components may be in communication with each other, directly or indirectly.

Time, screen location, and object-specific comments may be created for multimedia and other information content. A user interface of an input device 105 allows a commentator to generate a comment, associated with a time code, for example, relating to the content (which, for purposes of this disclosure, may include movie, TV show, Internet and other video, book, article, song or other audio recording, photograph or other image, commercial advertisement, video game, immersive media, augmented or artificial reality media, the content contained in a comment, or other displayed content). This created comment may be viewable to others watching the content in real time, or on a delayed basis. By using a time code, modified time code or other locator or combination of locators as an external reference, the comment need not actually be inserted into the multimedia, but may be called up from remote servers as the user reaches the applicable point. The comment may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof.

The comment may be stored locally (at the device 105, set-top box, or other storage device), or may be transmitted to the central server computer system 115 for cataloging and storage in data store 120. The central server computer system 115 may be made up of one or more server computers, workstations, web servers, or other suitable computing devices. The central server computer system 115 may be a cable or satellite headend. The central server computer system 115 may be fully located within a single facility or distributed geographically, in which case a network may be used to integrate different components.

Data store 120 may be a single database, or may be made up of any number of separate and distinct databases. The data store 120 may include one, or more, relational databases or components of relational databases (e.g., tables), object databases, or components of object databases, spreadsheets, text files, internal software lists, or any other type of data structure suitable for storing data. Thus, it should be appreciated that a data store 120 may each be multiple data storages (of the same or different type), or may share a common data storage with other data stores. Although in some embodiments the data store 120 may be distinct from a central server computer system 115, in other embodiments it may be integrated therein to varying degrees. The created commentary may be integrated into the underlying multimedia or other information content, or may be stand-alone content to be leveraged with technology allowing the time stamps to sync with the content as it is played.

The user may be alerted to the existence of a comment during playback of the content by the appearance of a viewing window or an icon that can be touched or clicked on output device 125, to reveal its contents. In other examples, the content and commentary may be separated. Users may tailor their experience by selecting certain commentators, or types of commentators and/or comments.

The components of the system 100 may be directly connected, or may be connected via a network 110 which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically. If no specific means of connection is noted, it may be assumed that the link, communication, or other connection between devices may be via a network.

The following description describes various aspects and options for the system. In the discussion below, the comments may be referred to as comments. Comments, as used herein, are to be interpreted very broadly. Comments may be created by users using input devices 105. Comments may be viewed and controlled by users using output devices 125. An input device 105 may be an output device 125, as well. Comments may be stored and organized in data store 120. Each feature is set forth for purposes of example only, and may be included or excluded in various embodiments.

A variety of interfaces may be used for comment creation. A commentator may use these interfaces to input a comment into a movie or TV show (or other media) and to have that comment viewable (if the comment is marked public) to anyone else viewing the media content. By using a modified time code as an external reference, the comment may not actually be inserted into the media or into any metadata, but may be called up from a remote server as a viewer reaches that point in the media. There may be an uninterrupted feed by anticipating and pre-loading any upcoming comments. The user may be alerted to the existence of a comment during media playback by the appearance of a comment icon that can be touched or clicked to reveal its contents.

Figure 2:
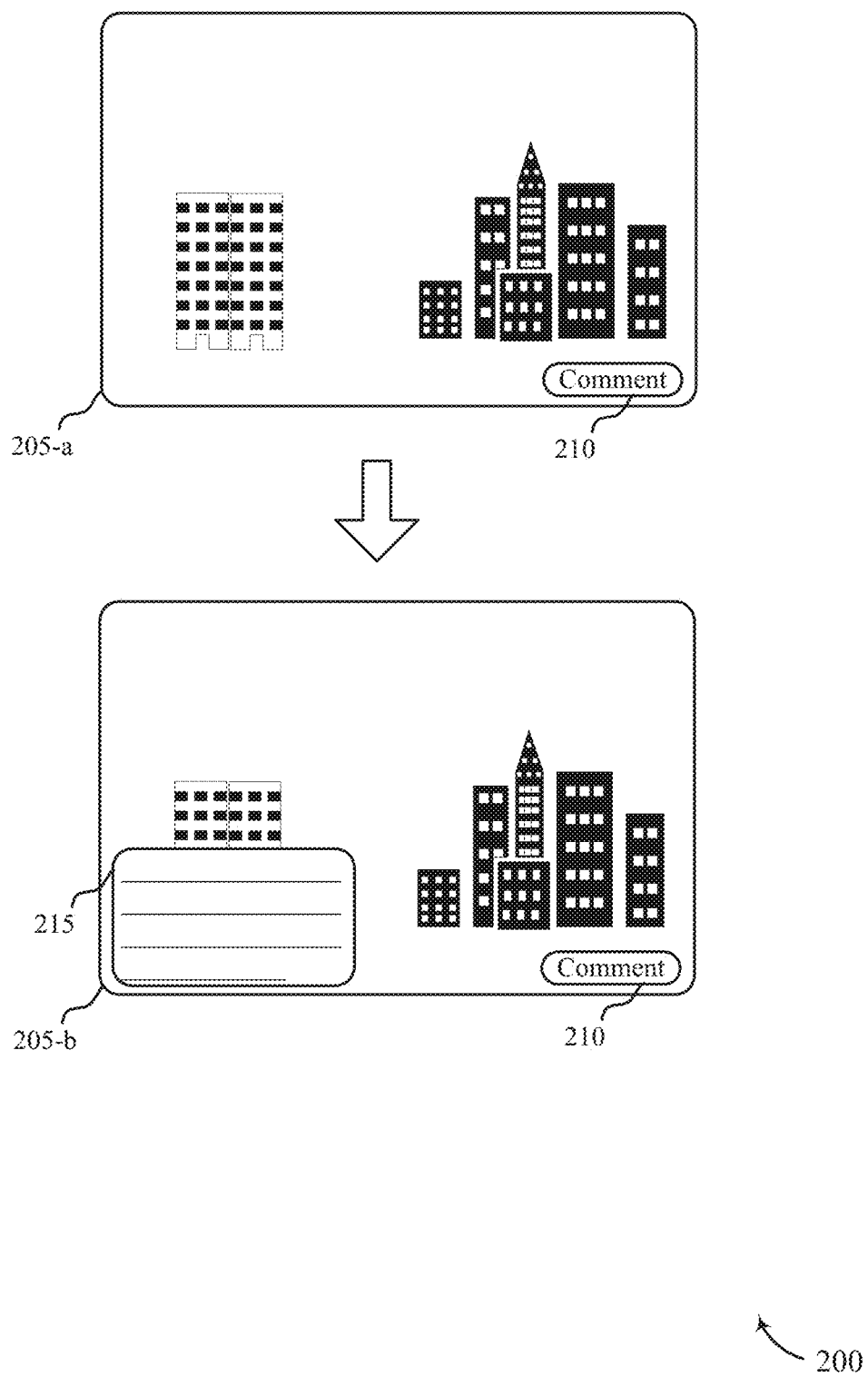
FIG. 2 is a block diagram of an example display with an interface for making comments according to various embodiments of the invention.

Thus, in one embodiment, there may simply be a time marker, screen location, and associated text for a given piece of content. This may be stored separately and independently from the underlying content. FIG. 2 illustrates an example block diagram 200 of a display 205 with an interface for making comments. The display 205 may be on, or integrated with, a mobile device, mobile phone, laptop, tablet, computer, television, head-mounted display, remote control, or any number of other computing or viewing devices. The display 205 may be a touch screen or be controlled by user inputs into a remote, peripheral, or other mobile device. In the illustrated display 205, the locate comment icon 210 is overlaid on the content. However, in other embodiments, the interface may be independent or on another screen or window from the content.

Display 205-*a* illustrates the interface at Time1, with a comment icon 210. A user may click on, or otherwise select, the comment icon 210. Display 205-*b* illustrates the interface at Time2. A comment entry window 215 appears in response to the selection of the comment icon to allow the user to comment via text entry.

A comment may be set to display for a preset, or configurable, period. A user may set in and out points so that an entire scene can be referenced by the comment. This may allow the user to 'capture' the scene or media sub-unit completely for reference and for playback or sharing. The user may set the comment to display at the beginning and end point, and to, optionally, display a scene marker during the span of the scene. This scene marker may be distinguishable from the standard comment marker. A user or the system also may set in and out points in combination with the identification of an entity or object on screen to capture the entire scene in which that object or entity appears.

As noted, comments are not limited to text, but may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. Comments may be made by speaking, and the comment may be replayed during play of the underlying content. Alternatively, there may be speech to text conversion for making comments and text-to-speech conversion for listening to comments. A user may insert a video of himself or herself with speech commentary, or other video may be inserted. Comments may be placed in specific locations on the display 205.

Comments from a number of users may be linked, associated, or otherwise integrated to create a comment set. A user may insert video, graphical, or audio overlays designed to be used simultaneously with media content rather than in separate or separable windows so that the media is augmented or fully joined by the message content. Comments may contain software applications that allow or trigger various actions within local or remote devices, software systems, or devices and systems within and outside the control of the user or the company or entity delivering these services. In this way, a comment can control local devices, for example, to reduce volume in one viewing window or pause or slow the media, or provide other services to the user or other entities. Comments may be used, for example, to control or administer micropayment systems for media or premium commentary. Comments may contain a hyperlink to points outside the comment systems and they also may contain a link to or an association with a comment within the comment system or they may contain several potential links offering user a choice of links to media, media subunits and other comments in the form of a question, quiz, survey, or other device such as a software player that can link the comments and play the resulting media and meta-media. Comments and link-containing comments may be daisy-chained or linked in a hub-and-spoke or other such arrangement to provide unique ways for users to move through media or through portions of media.

Comments may be inserted in traditionally non-time-based media such as paintings, photographs, and architectural renderings in such a way as to create simulations or animations that allow this media to take on the dimension of time. A commentary sequence might mirror the layering of paint on a canvas, the movement of a focal plane in a photograph from the farthest to the nearest point, or the construction sequence of a building. Such a commentary time flow simulation may then be used to invite further commentary along this artificial time line. Similar artificial time lines may also be created within time-based media to alter the time flow of the media or to allow the media to contain multiple time line spurs and other forms. For example, the image on a single video frame may be commented into multiple successive layers that represent an incremental progression in time to show the construction of the movie set shown in the video frame.

Comments may be inserted as header comments designed to appear to subsequent users in a viewing window associated with a point at the very beginning of the media and to contain general commentary about a piece of media not tied to a particular point on a timeline. Comments may contain messaging devices to allow the user, automatically or not, to send a message directly to another user or entity. Comments may include a device to exclude any user response from the public commentary or message stream so that it is viewable only as a private comment or message. Comments may have special status and functionality as super comments that allow individuals and entities, for example, a wiki service, to capture and distill various comments in a single comment or an ordered collection of comments, which can then be further vetted and added to. These super comments also may be filterable into collections of commentary that match a user's interests and sensibilities. Various comment types and combinations may be clearly marked with symbols, colors, or other methods to alert users to their capabilities and limitations.

In some embodiments, the windows position may be set automatically, or may be adjusted or otherwise customized at a user's discretion. Additional tabs and controls may be added to allow a user to select additional features described elsewhere herein.

Figure 3A:
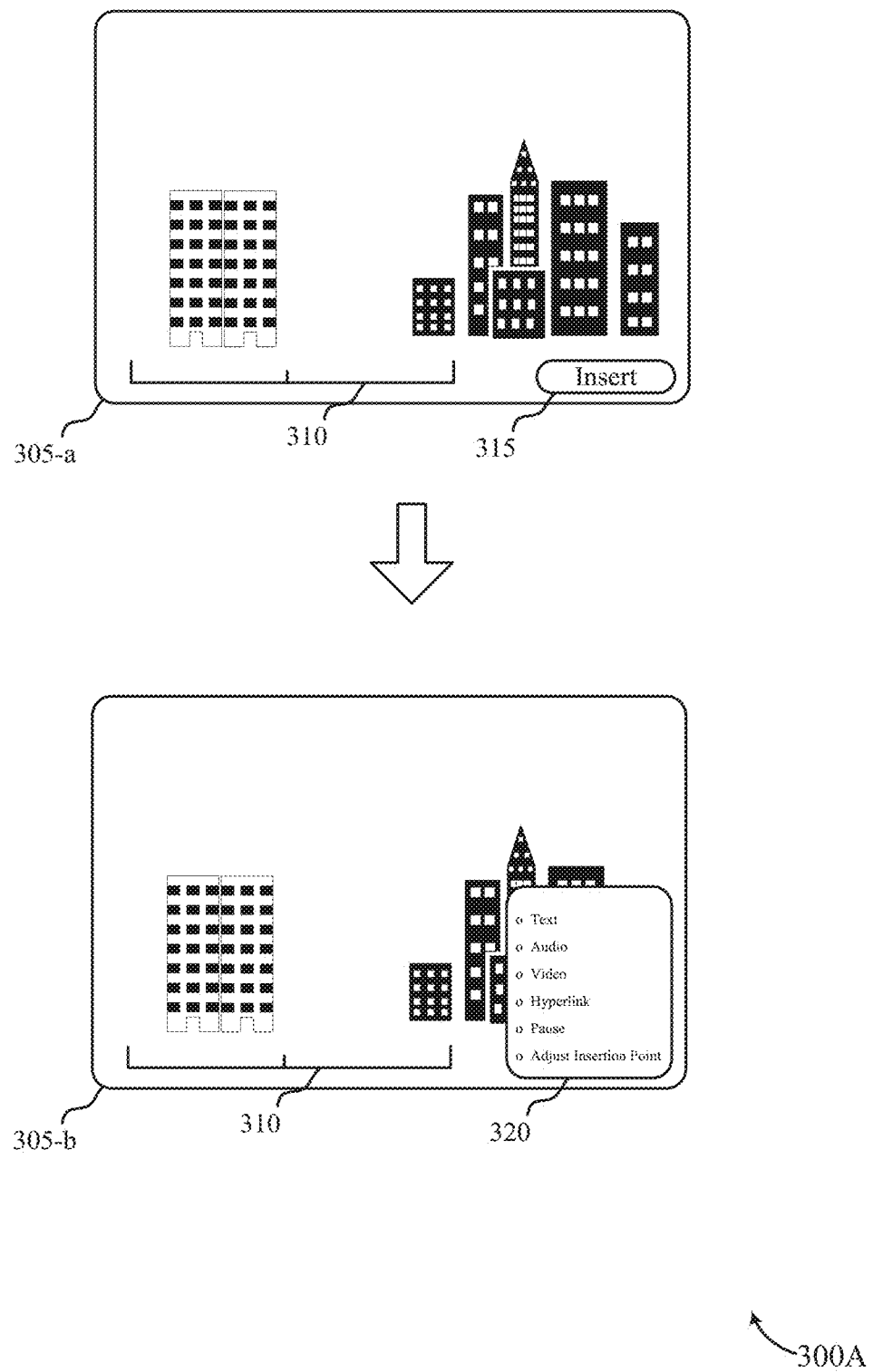
FIG. 3A is a block diagram of an example display with an interface for making comments according to various embodiments of the invention.

FIG. 3A illustrates an example block diagram 300A of a display 305 with an alternative interface for making comments. This display 305 may be an example of the display 205 described with reference to FIG. 2. The display 305 may be on, or integrated with, a mobile device, mobile phone, laptop, tablet, computer, television, head-mounted display, remote control, or any number of other computing or viewing devices. The display 305 may be a touch screen or be controlled by user inputs into a remote, peripheral, or other mobile device. In the illustrated display 305, an insert icon 315 and scrubber control 310 are overlaid on the content. However, in other embodiments, the interface may be independent or on another screen or window from the content. The scrubber control 310 allows a user to control the insertion timing within the content (e.g., within a 10 minute window).

Display 305-*a* illustrates the interface at Time1, with an insert icon 315 and scrubber control 310 overlaid on the content. A user may use the scrubber control 310 to identify the proper place for comment insertion, and then may click on, or otherwise select, the insert icon 315. Display 305-*b* illustrates the interface at Time2. A comment type window 320 appears in response to the selection of the insert icon 315 to allow the user to comment via text, audio, video, or hyperlink, or insert a pause, or adjust the insertion point.

Figure 3B:
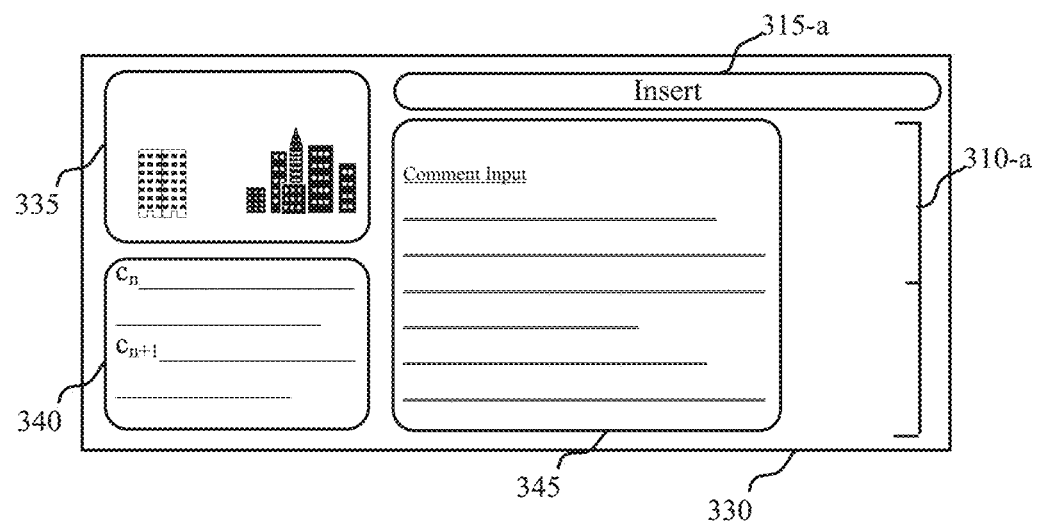
FIG. 3B is a block diagram of an example display with an interface for making comments according to various embodiments of the invention.

FIG. 3B is a block diagram 325 of a display 330 with an alternative interface for making comments. This display 330 may be an example of the display 205 described with reference to FIG. 2. The display 330 may be on, or integrated with, a mobile device, mobile phone, laptop, tablet, computer, television, head-mounted display, remote control, or any number of other computing or viewing devices. The display 330 may be a touch screen or be controlled by user inputs into a remote, peripheral, or other mobile device. In the illustrated display 330, an insert icon 315-*a*, scrubber control 310-*a*, content window 335, comment stream from other commentators 340, and comment entry window 345 are in different windows within the display 330. However, in other embodiments, each interface may be overlaid or integrated or on a screen, or some subset of this functionality may be on a different device.

A user may use the scrubber control 310-*a* to identify the proper place for comment insertion, and then may click on, or otherwise select, the insert icon 315-*a*. This display configuration allows a user to view the underlying content via content window 335, and also look at the comment stream 340 (perhaps filtered), and input comments into the comment entry window 345. In some examples, comments from the comment stream 340 may be dragged and dropped into the comment entry window 345, or otherwise selected for a comment set or other use. There may be threaded discussions, or comments from others may be pulled in.

A user may scrub a pane of commentary forward or back in its timeline and similarly scrub a media pane using software controls such as icons or touch gestures. Users may be able to control whether commentary and media panes are coupled or decoupled and may use coupling and decoupling to control multiple panes independently or together. For example, a user may be able to scrub both the comment stream window 340 and the content window 335 by swiping in either pane when an interface is set to a synchronization state, such as a 'hard sync' state.

A user may be able to set or decouple a 'hard sync' with touch gestures such as swiping both the commentary stream window 340 and the content window 335 simultaneously in the same direction to set a hard sync state or by swiping both windows 340, 335 simultaneously in opposite directions to turn off hard sync. Hard sync may be used to browse to media content at a desired location and view the relevant commentary, and/or to browse the commentary to view relevant moments in media. In certain examples, a hard sync control may be resident in one window so that swiping one window controls both windows while swiping the other window only controls the window being manipulated, allowing a user to freely manipulate one window out of synchronization without interrupting the time progression on another window. Such controls also may be used to manipulate multiple windows, and the set of windows being manipulated may or may not include a media window but may contain only commentary, for example. Other windows, such as the comment entry window 345 also may be set to control or be controlled by similar actions. Hard sync controls may be automatically applied within the user environment or may be set by the user.

These illustrative controls may allow a user to manage multiple windows each with multiple time referents and then use further manipulation to move or associate or perform other actions that allow a comment's time associations to be changed or to bridge multiple time associations. Doing so may allow a user to move a comment from one window to another to change its location in the media or to drop one comment onto another to associate the two comments. User actions to control synchronization and decoupling may include other gestures and manipulations such as tapping a handheld device or using swipe and other hand motions that do not contact a touchscreen but are otherwise sensed, or eye motions detected by the device and software or combinations of these gestures.

Resynchronization may be controlled by the user via software controls such as tapping in a window that represents the desired synchronization point, or resynchronization may occur automatically when a user manipulates a window so that it reaches the same point in the timeline as the other window. Automatic synchronization also may then be overridden with continued manipulation.

The system architecture for comment creation may take on a variety of forms. In some examples, DVD, broadcast, or streaming content may be received on a computer, set top box, or television. A user interface control (e.g., the control functions of the configurations illustrated in FIG. 2, 3A, or 3B) may be in the same screen, but distinct from the content (e.g., overlaid, or in separate windows). The user interface control and the content may be on different devices. The user interface control may use various mechanisms to associate a timestamp with the entry of a comment. In different embodiments, the user interface control may be integrated with content to varying degrees. The control window may receive inputs via a remote control, mobile device, keyboard, or other peripheral. The user interface control may control underlying content (i.e., pausing underlying content), or not, and it also may convey the underlying content to other devices for viewing and other actions.

Figure 3C:
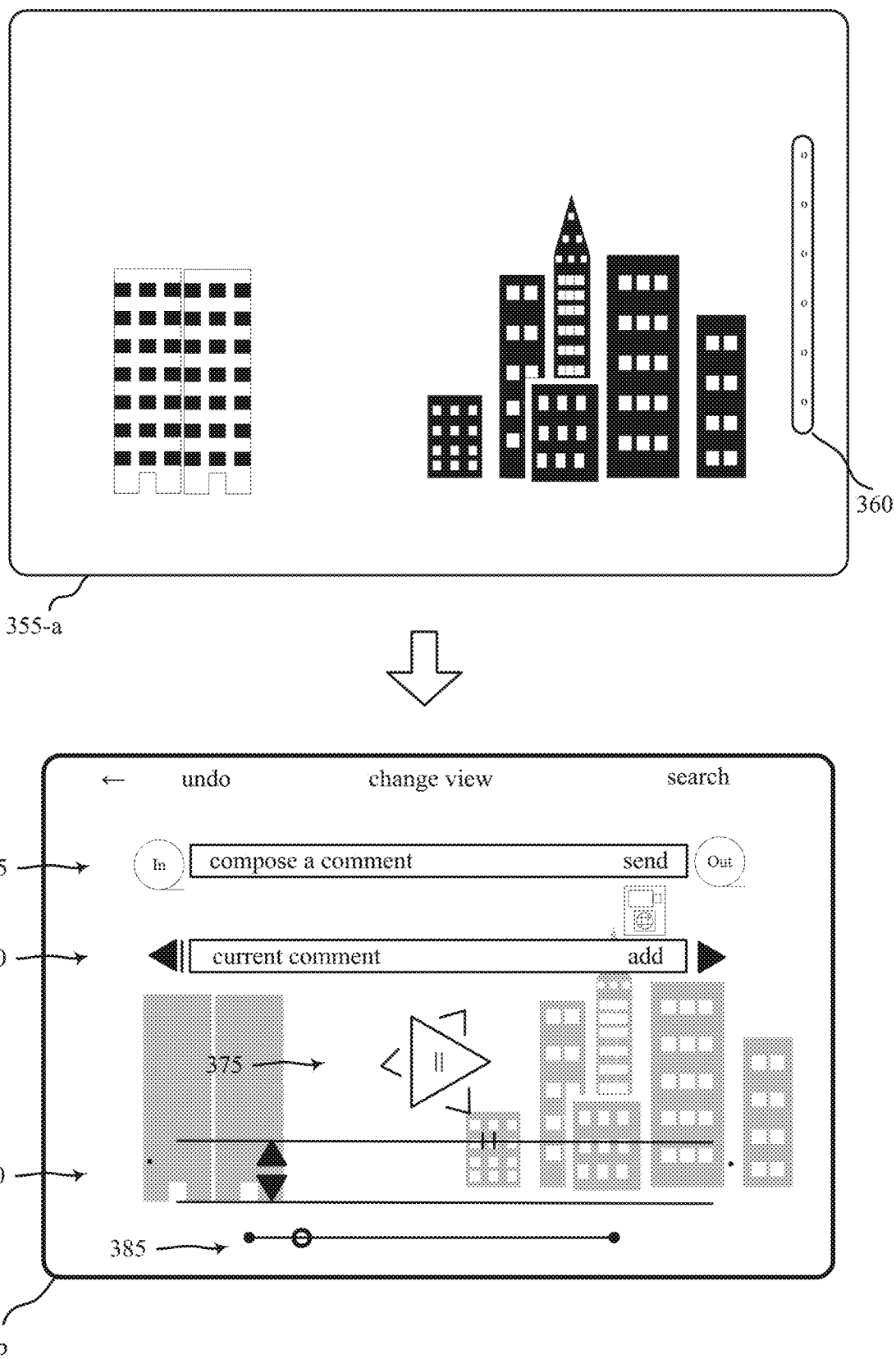
FIG. 3C is a block diagram of an example display with an interface for making comments according to various embodiments of the invention.

FIG. 3C illustrates an example block diagram 350 of a display 355 with an alternative graphical overlay system for making, and viewing, comments from a single interface or set of interfaces. This display 355 may be an example of the display 205 described with reference to FIG. 2. The display 355 may be on, or integrated with, a mobile device, mobile phone, laptop, tablet, computer, television, head-mounted display, remote control, or any number of other computing or viewing devices. The display 355 may be a touch screen or be controlled by user input into a remote, peripheral, or other mobile device.

Display 355-a illustrates the interface at Time1, with an array of circles 360 (which may be referred to as category beacons) overlaid on the content. These beacons 360 may each represent a type of comment or a category, or a comment source or source category and each beacon may light up as the video passes a point at which a comment has been inserted. If a beacon 360 is pressed and held, the comments filtered by category may be shown. The beacons 360 may show a steady glow for comments that capture a media clip or subunit, with increasing brightness when multiple commentators have chosen the subunit or portions thereof. Regular comments show as brief pulses. By tapping, or clicking on, any of these buttons the category may be displayed. By pressing and holding, the user may be taken to a comment viewing window (not shown) that has been filtered by the category. The user can navigate sideways to other comment windows in other categories, and vertically to comment windows filtered by type of comment, such as humorous, or subject area, such as cinematography. Certain aspect ratios (not shown) may allow some of the components illustrated to be displayed below the video field by user preference. Letterbox video may be shifted to the very top of the display to provide more room below. A window of comments may be displayed on one or more multiple lines, or in combination with other modular windows, such as a graphic to show traffic in the comment stream.

Display 355-b illustrates the interface at Time2. A user may select the option of having a graphical overlay appear, allowing the user to have controls to view comments, write a comment, scrub to comment insertion points, and other tasks. The graphical overlay may include a compose comment 365 set of features, and a current comment 370 set of features.

The compose comment 365 bar may be tapped, and the bar may expand to two lines and continue to expand as text is added. Below 'send,' on the second line is a pair of icons for audio and video recording of the comment. 'In' may be tapped to insert the comment at the current location in the media. It is not necessary to set an out point, but one can be set by scrubbing to the desired location in the media and pressing the 'out' button. The 'send' feature provides sending options such as 'send as a Tweet,' 'send to Facebook,' 'send as a message.' as well as an option to 'splice' this comment to another in a comment document, using a splice or linking comment to connect them.

The current comment 370 bar shows the most recent comment passed in the timeline. 'Current comment' may be tapped to view the entire comment. 'Current comment' may be pressed and held to go to a comment viewing window. A small vertical line to the left of the current comment shows when the current media has been captured within a comment clip, and gives a rough indication when more commentators also have chosen the current scene. The triangles at either end of the bar can be tapped to move forward and back through the comment timeline. 'Add' is a thumbs up, adding the comment to the user's set of comments that will be passed along to others.

In this example, there is also a unified play, pause, and reverse button 375. The button 375 may be designed to use a single control for media and other content windows. The default mode may be forward mode. A user may tap once to play, tap again to pause, tap again to play, and so on. From a paused state, a user may press and hold for 1 second (or other time period) to play in reverse (indicated, for example, by an audible sound, 1×). A user may tap to pause, tap to play in reverse, tap to pause. From a paused state in reverse mode, a user may press and hold for 1 second (or other time period) to play in forward mode. Tapping pause and play continues to advance media forward. A user may press and hold again for reverse mode. There may also be fast forward and reverse. In either forward or reverse mode, at play or reverse play speed, a user may press and hold the play button (e.g., holding for 1 second for 2× speed, holding for 2 seconds for 4× speed, and tapping to pause).

There may also be a split scrubber 380 that lets the user scan the media and the comment stream simultaneously, and to have control of each individually. To insert or view comments, a user slides a pair of triangle markers along a double timeline and finds a desired location. The top scrubber controls the media (when the media window is on top or to the left) and the bottom scrubber controls the comment stream below or to the right. The wide space between the lines controls them both simultaneously. Scrubber marks may disappear during finger (or cursor) swipe manipulation between the lines.

As the triangles are moved, they may change color or shading. This allows the user to be aware of a change in their position on the timeline when their movement would not otherwise be obvious. If the triangles are synchronized, the triangles may change color together, remaining the same color. If the triangles are out of synch, they may each change to different colors. This may help make the user aware that the user is out of synch when the distances on the timeline would not otherwise make it obvious.

With the split scrubber 380, a user may scan media and comments independently and quickly return the media to the place where it was paused. By tapping (or clicking) one or another of the relevant triangle markers, the user can choose to have the media resynchronized to the timeline location of either the media or the comments window. The user may also resynchronize by initiating play in the appropriate window. Aside from scanning and browsing, the split scrubber 380 may be used to change the insertion point or in/out points of a comment. The user may select a comment in the message window that he or she previously wrote, and after adjusting the media in the other window to the appropriate point, click the 'in' or 'out' icon, or click and drag the comment onto the media.

The split scrubber 380 also may be of use with other combinations of viewing windows, such as media and comment document windows, or comment and comment document windows. The split timeline may also be augmented with a third or fourth timeline to control multiple windows. The split scrubber 380 may also display the in and out points of the current comment if the comment pertains to a media clip (as opposed to a comment that has a single insertion point). It also may contain a space, for example, between the two lines, in which a finger swipe in either direction may advance the media to fine tune a location. It may contain points at either end that can be clicked or tapped to advance or reverse the media one frame at a time or advance or reverse the comment stream one comment at a time. These points may additionally be controlled by pressing and holding them to advance media in gradual acceleration up to 4×, for example. Fine control of this acceleration may be handled by a series of press/hold maneuvers, such as one press/hold for 1× speed and two press/holds for 2×. The split scrubber 380 also may be used to improve the speed of certain user operations when the system is unable to keep up with both media and commentary streams and when decoupling is desired.

A fine tune scrubber bar 385 may consist of a line within a window (horizontal or vertical) designed to focus finger swipe motions into a specific zone or to be manipulated by mouse control. It may be used without split scrubber 380 (e.g., it may be used in configurations in which use of a split scrubber 380 could lead to confusion or in which the split scrubber is too bulky). In some examples, a fine tune scrubber bar 385 may be used with each window with timeline-related elements, such as media and commentary, served by its own scrubber. Manipulation of one window may control both windows unless the synchronization of these windows is decoupled. Windows may be decoupled by pressing and holding one window while manipulating the scrubber of another. The windows can be resynchronized by initiating 'play' in either window, which synchronizes play to the chosen window. The disappearing scrub marker described herein may also have the capability of splitting into top and bottom halves so that this scrubber can be used as a less obtrusive split scrubber.

A fine tune scrubber bar 385 may be swiped from right to left, for example, to advance the media or commentary forward in the timeline. Rapid and repeated swiping may trigger the appearance of a marker indicating speed, such as 2× or 4×. It may also trigger the appearance of a scrub marker that shows progress along a timeline. When these markers appear, it may be a signal to the user to stop swiping and allow the content to continue at that speed to a desired point, or manipulate the markers to move a greater distance. A tap may again pause the content so that it can be fine-tuned by finger swipe. Pressing and holding a midpoint of the line may also trigger the display of the scrub marker and allow it to be manipulated to move greater distances in the timeline and to its beginning or end. This marker may disappear when the user makes further fine tune swiping motions. Tapping either end of the line may allow the user to advance frame by frame or comment by comment depending on the window. Pressing and holding one end of the line may increase scrubbing speed by successive increments, accelerating the speed from 2× to 4×, for example. This may work whether or not the scrub marker is visible, though it may also cause the scrub marker to appear so the user is aware of motion in the timeline. Releasing this may cause the window's content to pause again, or it may continue at that speed until the window is tapped to pause it. Further swiping may return the user to fine adjustments.

This scrubber bar 385 also may show fine movement in the disappearing scrub marker(s) by changing the color of the marker and the marker halves in the same manner as the split scrubber. These scrub markers may also be manipulated in the manner of the split scrubber above to decouple media from other windows and, by pressing and holding one or the other, resynchronizing to the timeline of the desired window.

There may also be browse scrubber functionality. Browse mode may be activated by pressing and holding a point in the media or comment window. Both may pause as soon as one is touched. Now either window may be manipulated by horizontal finger swipes to scrub the media and the comment stream forward and reverse. Rapid swiping in one direction (e.g., three times) may increase the speed of scrubbing and trigger the display of an optional simple scrubber bar and marker that can be manipulated to move greater distances in the timeline. If the optional simple scrubber bar is not manipulated, it may disappear after a short interval. If it is manipulated, once a finger is lifted from the scrubber, it may disappear and finger swiping may be automatically reactivated. While this swiping tool may default to simultaneous and synchronized viewing of both windows, the windows may be decoupled by manipulating one window with a swipe while pressing and holding the other. Once decoupled, the held window no longer needs to be held, and it stays in its position in the timeline.

In browse mode, there may be one screen anchored in a position in the timeline if the user hopes to return both windows to this original location to continue a viewing session. When it is time to resynchronize, the user can press and hold the window that is currently at the desired location, and the windows are synched. This mirrors a similar operation on the split scrubber in which the windows are resynchronized by pressing and holding the triangle marker associated with the window that is in the desired timeline position. If a user mistakenly presses the wrong window, the undo command may return the windows to their previous positions. The interface also may contain a command that can return the media to its previous viewing position(s) in case many user actions have transpired since the viewing session was interrupted. This command may be a second tier option of the undo command.

Browse mode may also allow the user to manipulate the media and comment screens vertically. Vertical strokes in the media window may move through other media in the queue or its sub-queues or through other comment projects underway. Pressing and holding points at the top and bottom edges of the window may move through sub-queues and other of these categories. This vertical movement may be helpful when the user is working across media to link scenes, create timeline-independent comment sets, build annotated music playlists, or create other commentary/media documents. It also allows a user to switch gears and enjoy other media.

The comment window may continue to display commentary from the first media until the user presses and holds the media window to synch commentary to that media and location on the timeline. Vertical strokes in the comment window move the window through the current list of comments arranged in timeline order, and each comment is expandable with a tap. Pressing and holding points at the top and bottom edges of the window may move through categories and classes of commentary so the user can view comments on a certain topic or of a certain type, such as humorous. Vertical movement in the comment window may be used in conjunction with horizontal movement to find a category (vertical movement to 'acting') and then move horizontally to select a type of comment, such as humorous, to display humorous comments about the acting. In windows or operations that benefit from diagonal movement, such as forms of a comment document builder, finger swipes can move screen objects diagonally and may move through matrices diagonally as well. Matrices and other mapping devices may also be viewed and navigated via other constructs in a 3D or simulated 3D environment, and the element of movement through time may add a fourth dimension to this navigation.

Browse mode may be further augmented with controls that allow the user to tap the edges of a viewing window to control incremental movements. In the media window, for example, a tap to the right edge (or a specifically marked spot on the edge) may advance the media one frame. In the message window, a similar tap may advance the comment stream by one comment. Taps on the top and bottom edges may advance the media window through the queue or sub-queues, and move the comment window through the comment categories. Pressing and holding these edges or marks may move the material in the window to its beginning or end point, such as the end of a media. Finger swiping may be augmented or substituted by comparable mousing controls, such as clicking and dragging within a control bar, or with eye movements, such as two rapid glances toward one edge of the screen when a specific viewing window is selected.

Figure 4:
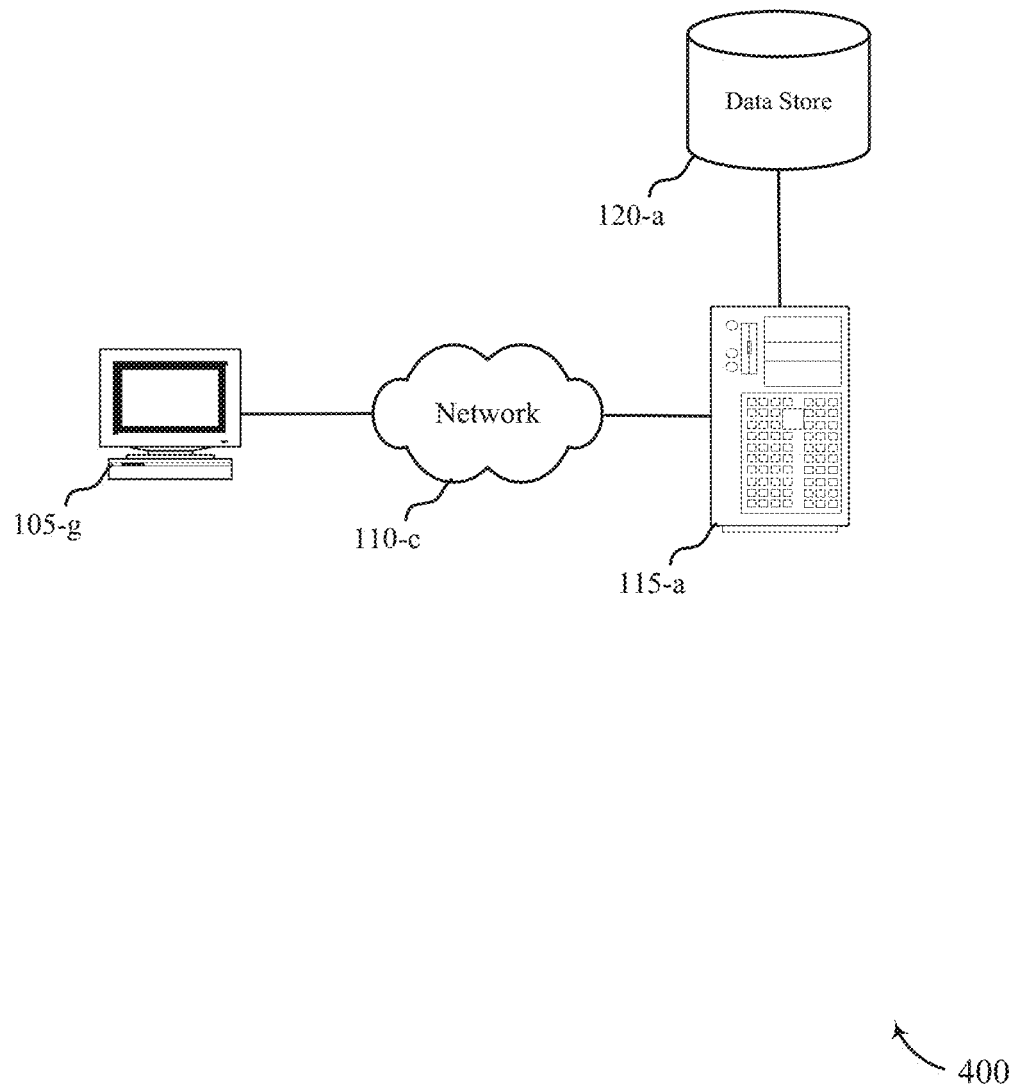
FIG. 4 is a block diagram of an example system including components configured according to various embodiments of the invention.

In one set of embodiments, shown in FIG. 4, a system 400 includes input device 105-g (e.g., a computer or television), network 110-c, central server computer system 115-a, and data store 120-a. Although in this case a central server computer system 115-a, the underlying content may be accessed from a local source (e.g., DVD or other locally stored multimedia). This system 400 may be the system 100 of FIG. 1. Each of these components may be in communication with each other, directly or indirectly.

The central server computer system 115-a may stream, or otherwise transmit, video data (or other information data) to the input device. This content may be accessed from data store 120-a.

Time, screen location, and object-specific comments may be created for the content. A user interface control of an input device 105-g allows a user to generate a comment, associated with a time code, for example, relating to the content (which, for purposes of this disclosure, may include a movie, TV show, Internet and other video, book, article, song or other audio recording, photograph or other image, commercial advertisement, video game, immersive media, augmented or artificial reality media, the content contained in a comment, or other displayed content). By using a time code, modified time code, or other locator or combination of locators as an external reference, the comment need not actually be inserted into the multimedia. The comment may include text, video, audio, photographs and other images, graphical overlays, animations, musical notations, geographic coordinates, discussion threads, external and internal links and associations with media, meta-media or other comments, software applications and applets, special notations to set and grant permissions and define system behaviors or any combination thereof. The user interface control may be generated locally, or served from the central server computer system 115-a to the input device 105-g via network 110-c.

In one example, the content stream and user interface control are independent and distinct from each other (even when both are on the same display). In other embodiments, the content stream and user interface control are overlaid or partially integrated. In still other embodiments, the content stream and user interface control are tightly integrated. The following examples further illustrate the options.

Figure 5:
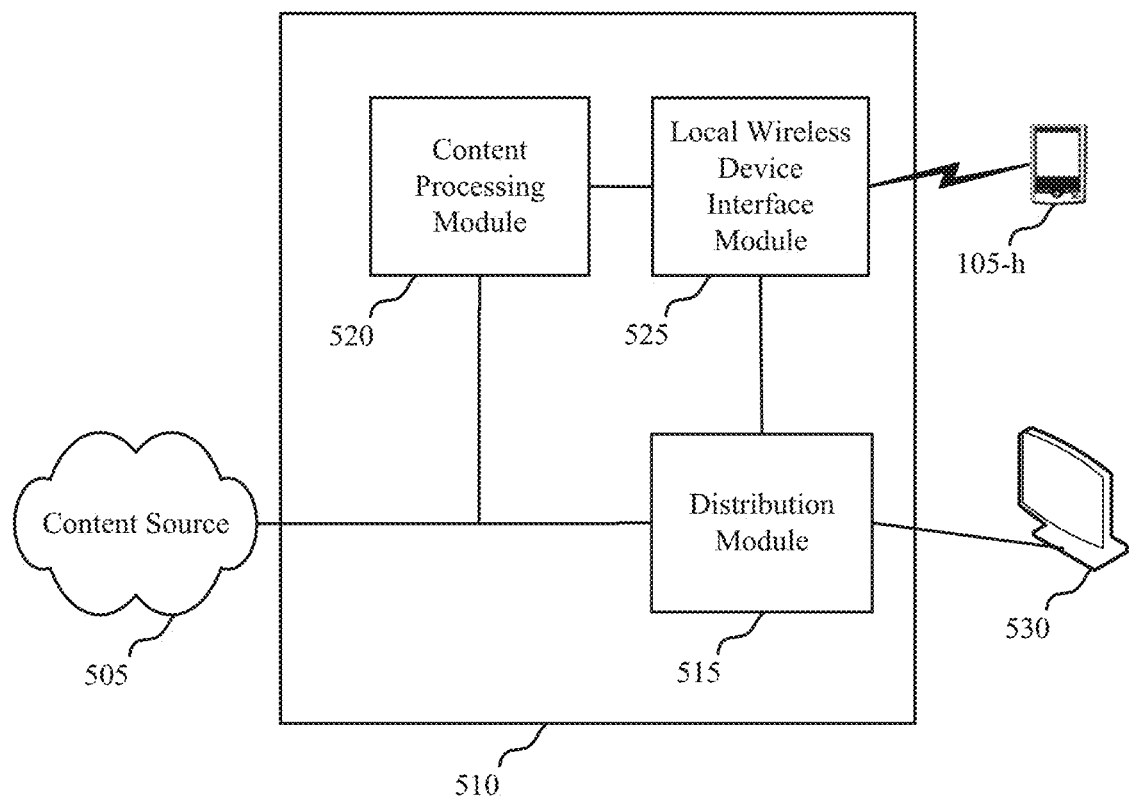
FIG. 5 is a block diagram of an example system including components configured according to various embodiments of the invention.

FIG. 5 illustrates a system 500 which includes a content source 505 (which may be a DVD or other video disc player, a local or remote storage device, a central server computer system), a set top box 510, a mobile device 105-h (e.g., a tablet, smartphone, remote control, cell phone, or laptop), and a display 530 (e.g., television or other display). The set top box 510 includes a distribution module 515, content processing module 520, and local wireless device interface module 525. Each of these components may be in communication with each other, directly or indirectly. This system 500 may be the system 100, 400 of FIG. 1 or 4.

In one example, the content source 505 streams media content to the set top box 510, which is stored by the content processing module 520. The content processing module 520 may create an echo version of the media content. As used herein, the terms "parallel echo version" or "echo version" refer to a representation of the media content displayed concurrently with a playback of a standard version of the media content. In certain examples, the "echo version" may simply be a lower resolution or lower bandwidth version of the media content. Additionally or alternatively, the echo version may modify or remove certain aspects of the media content, such as replacing visual elements in the media content with outlines or removing a certain range of frequencies from an audio component of the media content.

In parallel (or substantially in parallel), the content processing module 520 may provide a regular or high definition version of the content to distribution module 515 for delivery to display 530, while also delivering the echo version to the local wireless device interface module 525. Local wireless device interface module 525 may deliver the echo version wirelessly to the mobile device 105-h. The mobile device 105-h may control the playback of the echo to time the insertion of comments from the mobile device 105-h, and this echo timing may be distinct and independent from the content playback on the display 530 (i.e., the echo version and regular/high definition are not synchronized). In other embodiments, the playback of the echo version and the regular/high definition version are synchronized (so that control to stop, pause, fast forward, rewind at the display 530 (for the regular/high definition version) or the mobile device 105-h (for the echo version or the regular/high definition version) controls both displays).

Local wireless device interface module 525 may generate a user interface control for delivery to the mobile device 105-*h*. This user interface control may be transmitted with the echo version of the content to mobile device 105-*h*. Alternatively, the user interface control may be generated locally (e.g., as an App stored at the mobile device 105-*h*, wherein the echo version is integrated with the user interface control at the mobile device 105-*h*.

In certain examples, the functionality of the set top box 510 shown in FIG. 5 may be performed by an alternate device, such as the content source 505, a special-purpose internet appliance, a server, a network router, a network switch, and/or or a network access point.

In another example, the content source 505 streams different versions (the echo version and the regular/high definition version) of the content to the set top box 510, each of which may be stored by the content processing module 520. The content processing module 520 may provide the regular or high definition version of the content to distribution module 515 for delivery to display 530, while also delivering the echo version to the local wireless device interface module 525. Local wireless device interface module 525 may deliver the echo version wirelessly to the mobile device 105-*h*. The mobile device 105-*h* may control the playback of the echo version to time the insertion of comments, and this echo timing may be distinct and independent from the content playback on the display 530. In other embodiments, the playback of the echo version and the regular/high definition version are synchronized. A portion or sample of the echo may be attached to or included with the comment when a time code or modified time code or other placement techniques alone would be insufficient to assist with synchronization or in the absence of a connection to the Internet or to the appropriate local processing module. A portion or sample of the echo also may be attached or included with the comment when it may be useful to a subsequent user as a reference or other tool.

There are a number of other ways an echo version may be pulled out of the stream for time code needs. Echo version creation may occur at a central server computer system, on the set top box 510, at the display 530, or at the device 105-*h*. This echo version may also be designed so that it satisfies the need for 1) time code synchronization, 2) rough visual cross-checking to help users ensure that comments match up with desired input location, 3) scrubbing for fine tuning of comment placement, 4) delivery to comment servers to cross-check or identify media or provide synchronization, 5) faster retrieval, viewing, and selecting of media clips, or 6) any combination of these uses.

This echo version may be 1) a simple time code conveyance such as a media timer linked to the media content as displayed, 2) a low resolution version of the media content that stays within the bounds of copyright restrictions, 3) a version of the media content that is encoded to be inaccessible beyond time code use, 4) a version of the media content that is altered to be recognizable by the user but not in its standard and enjoyable form (such as music with a significant section of the frequency range removed, or such as video with only rough object outlines), or 5) a version of the media that is altered to be usable only by, for example, a data system designed to match audio waveforms, equivalent forms of video, and equivalent forms of text and other multimedia, or 6) any combination of these uses. An equivalent form of text, for example, might utilize word counts, word and letter count sequences, or a very difficult to read font or combination of fonts.

Figure 6A:
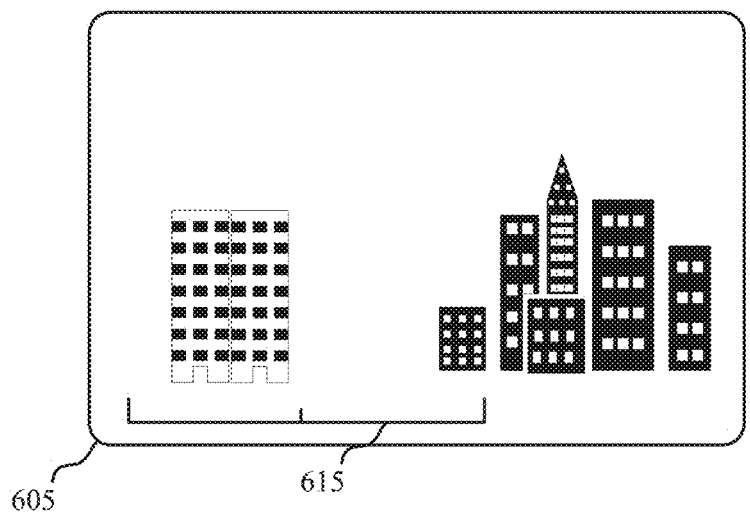
FIG. 6A is a block diagram of an example display of a standard version of media content according to various embodiments of the invention.
Figure 6B:
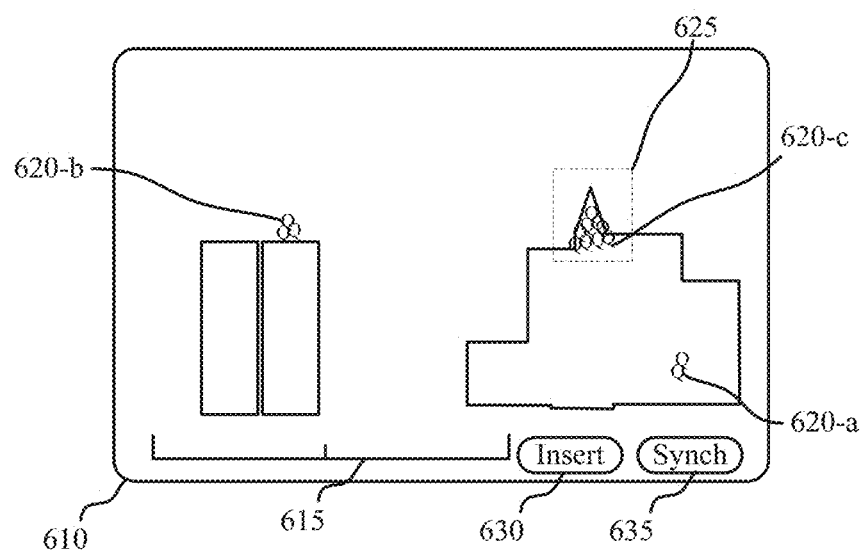
FIG. 6B is a block diagram of an example display of a parallel echo version of media content according to various embodiments of the invention.

FIG. 6A and FIG. 6B illustrate displays 605, 610 from a standard version and an echo version, respectively, of the same media content. The displays 605, 610 may be examples of the displays 205, 305 described with reference to FIG. 2 or FIGS. 3A-C. In the illustrative context of FIG. 5, the standard version of the media content may be displayed on the display 530, and the echo version of the media content may be displayed on the mobile device 105-*h*. Each of the standard version and the echo version may include a separate scrubber bar 615 to allow for asynchronous navigation through the standard version 605 and the echo version 610. The standard version and the echo version of the media content shown in FIG. 6A and FIG. 6B are in a state of synchronization for the purposes of illustration.

The echo version of FIG. 6B replaces objects (e.g., buildings) in the standard version of the media content with outlines. Doing so may save bandwidth and enforce certain content duplication restrictions in place for the media content. Alternatively, as described above, the echo version may simply be a low resolution version of the media content. Indicators 620 of existing comments associated with a current point in time in the echo version of the media content are marked with the letter Q.

A viewer may click on a Q or select an area 625 of Qs to view or receive more information on the comments. As noted, comments are not limited to text, but may include text, audio, video, links, applications, other threads, or any combination thereof. Comments of different types may have different letters, or different colors, shapes, effects, fonts, and/or other aspects that distinguish the comments. Comments within a 3D environment may be overlaid on the image in ways that make use of 3D to display them joined with the media so that objects in the echo version and comment indicators are able to, for example, occlude each other from view.

As shown in FIG. 6B, the indicators 620 may be displayed at different screen locations within the echo version to represent associations between individual comments and screen locations in the media content. The indicators 620 may represent comments retrieved from a central server computer system, such as the central server computer system 115 described in FIG. 1 or 4. Additionally or alternatively, the indicators 620 may represent comments stored locally at a device displaying the echo version of the media content. A user may view one of the existing comments by selecting an indicator 620 for that comment using, for example, a finger tap or a cursor.

The echo version may also be displayed with an insert icon 630 for associating a new comment with the media content. The insert icon 630 may be an example of the insert icon 630 described above with reference to FIG. 3A. Additionally or alternatively, the echo version may include other comment insertion controls for associating comments with the media content, for example, as described above with reference to FIG. 3B and FIG. 3C.

The echo version may further include a synchronization icon 635 for initiating a synchronization request in the device displaying the echo version. Upon initiating the synchronization request, a current point in the display of the echo version may be adjusted to bring the echo version into synchronization with the standard version displayed on the other device.

This synchronization may be implemented in a number of ways. For instance, in examples where both the standard version and the echo version are streamed in parallel from a common set top box or a central server computer system, the set top box or central server computer system may adjust the stream of the echo version to synchronize delivery of the echo version with delivery of the standard version of the media content. In other examples, such as examples where the standard version is streamed separately from the echo version, sampling and waveform or other pattern recognition may be used to synchronize the delivery of the echo version with the delivery of the standard version. One such example is described in more detail with respect to FIG. 7.

Figure 7:
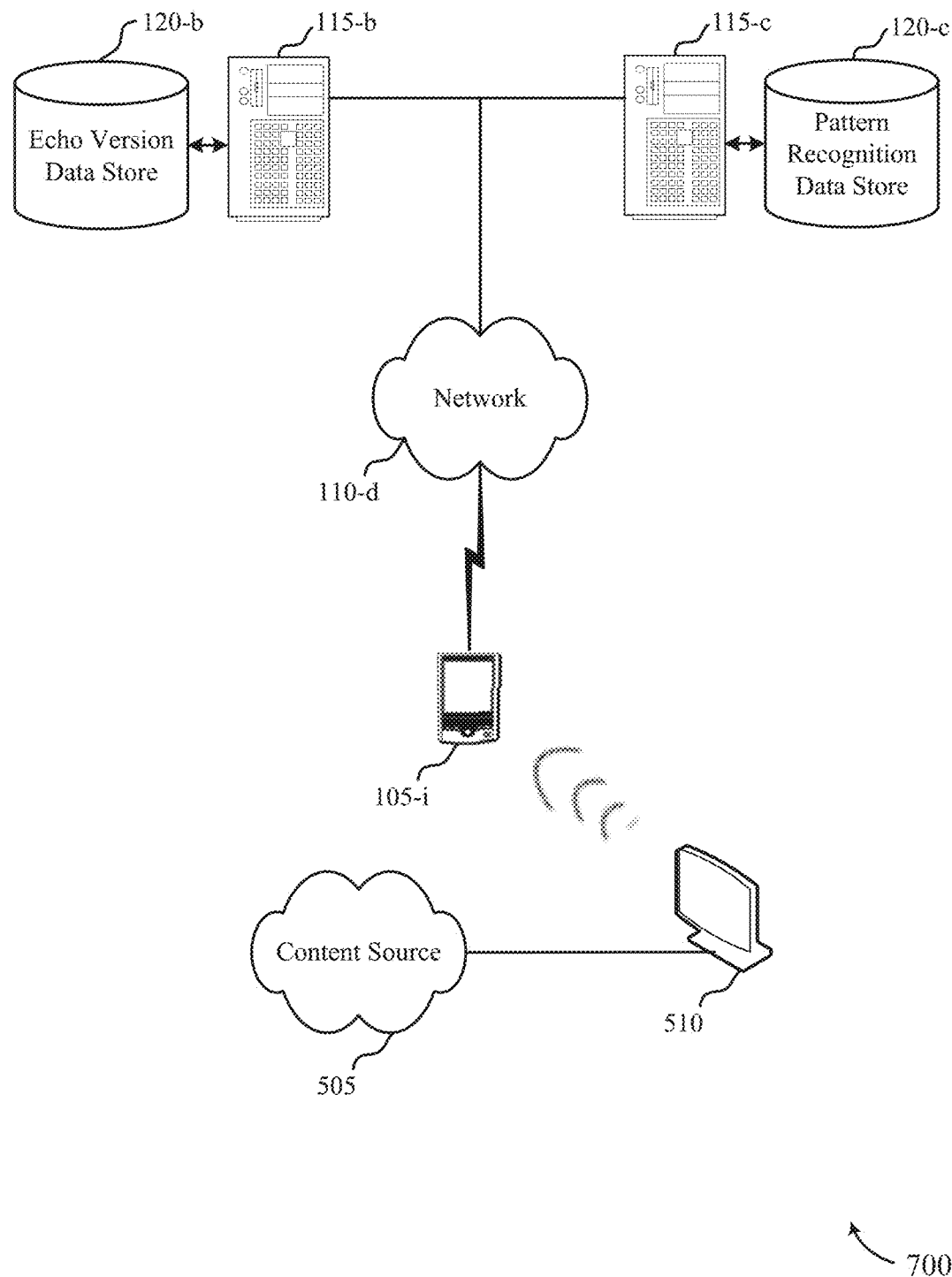
FIG. 7 is a block diagram of an example system including components configured according to various embodiments of the invention.

FIG. 7 illustrates a system 700 which includes a content source 505 (which may be a DVD or other video disc player, a local or remote storage device, a central server computer system, and/or the like), a display 610 (which may be a, television, a monitor, other display device, and/or the like), a mobile device 105-*i* (which may be a tablet, smartphone, remote control, cell phone, laptop, head-mounted or eyeglass display, other mobile device, and/or the like), a network 110-*d*, an echo version server 115-*b*, an echo version data store 120-*b*, a pattern recognition server 115-*c*, and a pattern recognition data store 120-*c*. Each of these components may be in communication with each other, directly or indirectly. This system 700 may be the system 100, 400 of FIG. 1 or FIG. 4. The echo version server 115-*b* and the pattern recognition server 115-*c* may be examples of the central server computer system 115 described with reference to FIG. 1 or FIG. 4. The echo version data store 120-*c* and the pattern recognition data store 120-*c* may be examples of the data store 120 described with reference to FIG. 1 or FIG. 4.

In one example, the content source 505 streams or otherwise transmits a standard version of media content to the display 510. The display 510 plays the media content. The echo server 115-*b* streams an echo version of the media content from the echo data store 120-*b* to the mobile device 105-*i* over the network 110-*d*. The echo version of the media content may be streamed to the mobile device 105-*i* independently from the streaming of the standard version of the media content to the display 510.

The mobile device 105-*i* may obtain a sample of the media content playing on the display 510 by capturing audio and/or video from the display (e.g., through a microphone and camera) at a sampling point. The mobile device 105-*i* may transmit the captured audio or video sample over the network 110-*d* to the pattern recognition server 115-*c*, which may identify the sampling point in the media content playback at the display 510 by comparing the sample to waveform or other pattern recognition data in the pattern recognition data store 120-*c*. The pattern recognition server 115-*c* may also identify the media content. A variety of audio and/or video recognition techniques known in the art may be used to facilitate content recognition.

The pattern recognition server 115-*c* may generate a time code associated with the sampling point within the content. Alternatively, a native application at the mobile device 105-*i* may perform some of these functions. The mobile device 105-*i* may determine a current point in the playback of the media content at the display 510 based on an offset between the determined sampling point and a current time. The mobile device 105-*i* may then communicate with the echo version server 115-*b* and/or jump to a different point in a local cache of echo version data to synchronize the display of the echo version of the media content with the display of the standard version of the media content at the display 510. A user may then view and insert comments at the mobile device 105-*i* in synchronization with the playback of the standard version of the media content at the display 510.

These comments may be stored locally at the mobile device 105-*i* and/or at a comment data store (not shown) accessible over the network 110-*d*.

Figure 8:
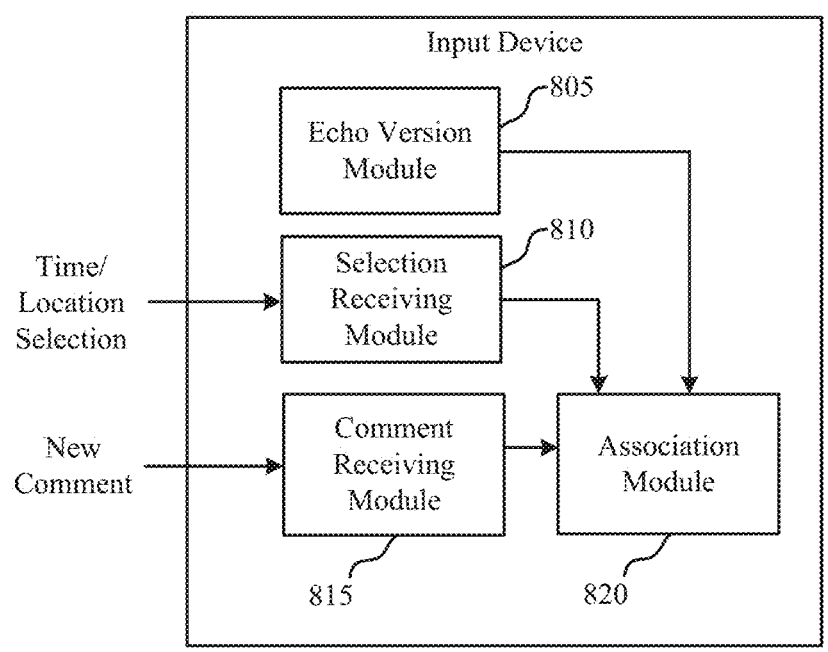
FIG. 8 is a block diagram of an example input device including components configured according to various embodiments of the invention.

Referring now to FIG. 8, a block diagram of an example of an input device 105-*j* is shown. The input device 105-*j* may interact with a user during playback of media content to receive and store comments about specific portions of the media content. The input device 105-*j* may be an example of the input device 105 described above with respect to FIG. 1, 4, or 7. The input device 105-*j* may provide a user interface which allows the user at least to generate comments about media content and associate the comments with discrete points during the playback of the media content.

The input device 105-*j* of the present example includes an echo version module 805, a selection receiving module 810, a comment receiving module 815, and an association module 820. Each of these components may be in communication, directly or indirectly. The echo version module 805 may be configured to display a parallel echo version of the playback of media content occurring on another device. In one example, the input device 105-*j* may be a tablet computer in the possession of a user who is simultaneously viewing the playback of the media content on a separate display. The echo version module 805 may receive echo version data over a network or from local storage and display the echo version of the media content to the user, as described above.

The selection receiving module 810 may interact with the user to receive from the user a selection of a portion of the echo version of the media content for insertion of a comment. The selected portion of the echo version may include a time code and/or a location indicator within the echo version of the media content.

The selection of the portion of the echo version may be received using any of a variety of means. In certain examples, the user may select the portion during the display of the echo version using a scrubber control (e.g., scrubber 615 of FIG. 6B) or a split scrubber control (e.g., split scrubber 380 of FIG. 3C). Additionally or alternatively, the user may select the portion of the echo version during the display of the echo version of the media content by tapping a button or making a menu selection at a certain time during the display of the echo version of the media content to indicate an insertion point. The insertion point may be selected in real time during the playback of the media content and/or retroactively.

In certain examples, the selection receiving module 810 may receive multiple selections from the user of multiple points during the playback of the media content for association with a single comment. For instance, as described above, the user may select a first point during the playback of the media content for insertion of the comment and a second point during the playback of the media content to indicate an expiration or termination of the display of the comment.

The comment receiving module 815 may be configured to receive a comment from the user. The user may intend that the comment be associated with one or more portions of the media content corresponding to the selected portions of the echo version. The comment may include text and/or other content. In certain examples, the comment may include recorded audio, video, hyperlinks, animated content, and/or other content. As described previously, some comments may even include software functionality, such as applications or applets that may be invoked when the comments are viewed. For instance, a comment may include executable code such that when the comment is viewed, the code is executed to display an interactive activity to the viewer.

In additional or alternative examples, the comment(s) received at the comment receiving module 815 may be associated with one or more existing comments to allow a viewer of the comments to move through a daisy chain or other linked organization of comments, as described previously. Thus, when a comment is received at the comment receiving module 815, the input device 105-*j* may be further configured to receive a selection of a second comment from the user for association with the first comment.

Once the selected portion of the echo version has been received by the selection receiving module 810 and the comment has been received by the comment receiving module 815, the association module 820 may be configured to associate the received comment with one or more portions of the media content corresponding to the selected portion of the echo version module. Where applicable, the association module 820 may also associate the received comment with one or more other comments. This association may make it possible for a device or process receiving the comment to identify the most relevant portions of the media content to which the comment applies. An association with another comment may allow the explicit or primary time code of a comment to be of secondary importance when placed in a user's media time line and may cause it to be overridden or adjusted in favor of the time code of the other comment, or it may be associated with multiple points on a time line to correspond with multiple comments. Associating one comment with another may also be used as a way to correct the placement of a misplaced comment or suggest a new placement The comment may be received at the comment receiving module 815 at a different point during the playback of the media content on the separate display device than the point with which the user intends to associate his or her comment. For example, a user watching a video on the separate display device may select point A for insertion of a comment by tapping an insert icon on the input device 105-*j* during a portion of the echo version corresponding to point A. The separate display device need not be synchronized with the echo version shown on the input device 105-*j* for the user to select a comment insertion point based on the echo version.

The association of the received comment with the portion of the media content corresponding to the selected portion of the echo version may be accomplished in a number of ways. In certain examples, the comment may be annotated with one or more pointers to the relevant portion(s) of the media content. Additionally or alternatively, a record of the relevant portion(s) of the media content may be annotated with a pointer to the comment. In still other examples, a central database may include references to comments and comment insertion points during the playback of the media content, such that a reference to the received comment in the central database is associated with a reference to the insertion point selected for that comment during the playback of the media content.

In certain embodiments, the input device 105-*j* may be the same device used by the user to view the playback of the media content. For example, the input device 105-*j* may be a laptop or tablet computer which simultaneously plays the media content to the user and produces an echo version of the media content which allows the user to generate comments for association with specific points in the media content.

Figure 9:
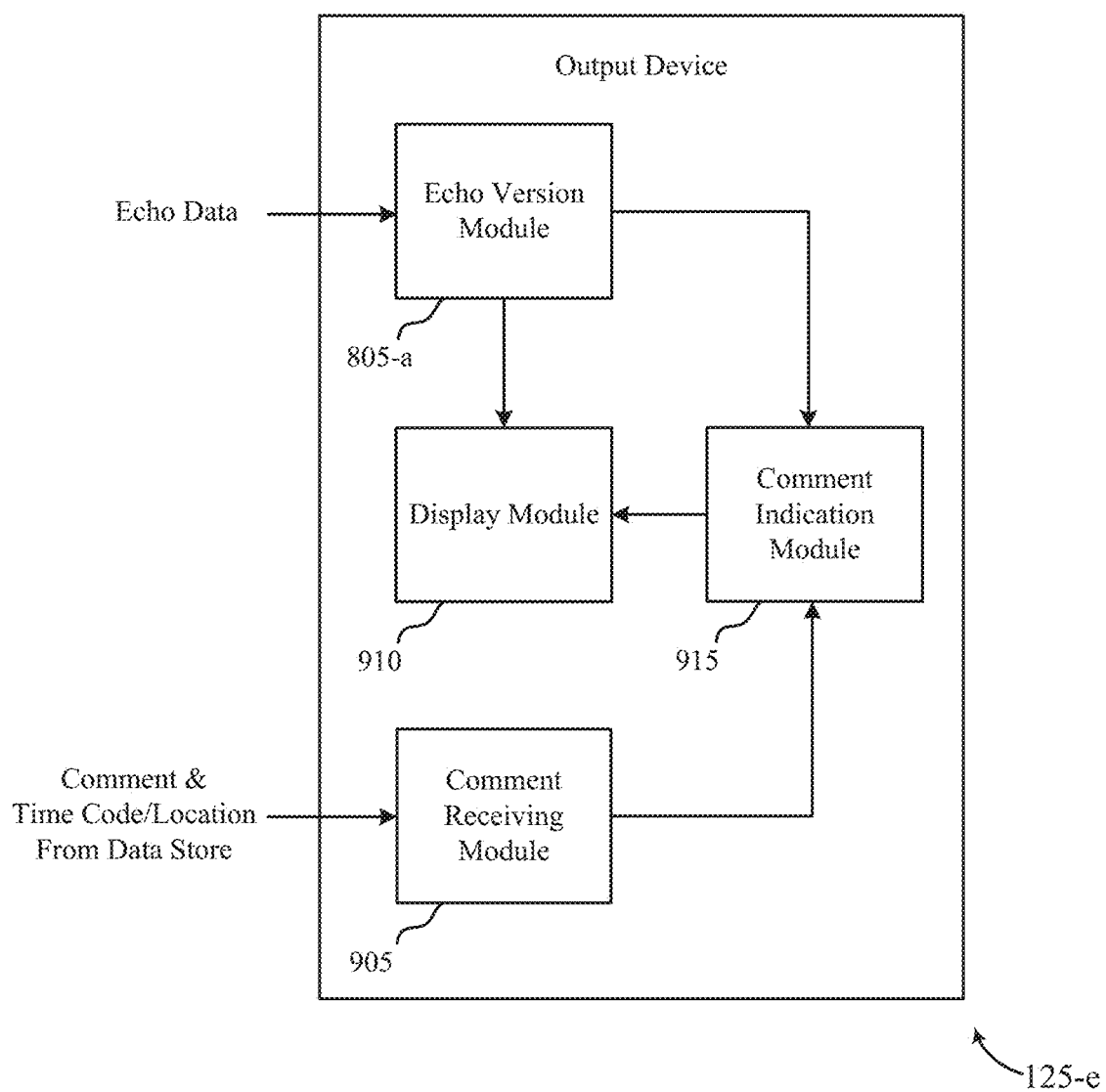
FIG. 9 is a block diagram of an example output device including components configured according to various embodiments of the invention.

Referring now to FIG. 9, a block diagram of an example of an output device 125-*e* is shown. The output device 125-*e* may interact with a user during playback of media content to display comments to the user about specific portions of the media content. The output device 125-*e* may be an example of the output device 125 described above with respect to FIG. 1, and/or the set top box 510 described above with reference to FIG. 5. In certain examples, the output device 125-*e* may also be an example of the input device 105 described above with reference to FIG. 1, 4, 7, or 8. The output device 125-*e* may provide a user interface which allows the user at least to receive and view comments about the playback of media content occurring on, for example, a separate device.

The output device 125-*e* of the present example includes an echo module 805-*a*, a comment receiving module 905, a display module, and a comment indication module 915. Each of these components may be in communication, directly or indirectly.

The echo version module 805-*a* may be an example of the echo version module 805 described with reference to FIG. 8. The echo version module 805-*a* may be configured to display a parallel echo version of the playback of media content occurring separately on another device or on the output device 125-*e*. In one example, the output device 125-*e* may be a tablet computer in the possession of a user who is simultaneously viewing the playback of the media content on a separate display. The echo version module 805-*a* may receive echo version data over a network or from local storage and feed the echo version to the display module 910 for display to the user.

The comment receiving module 905 may be configured to receive comments from a data store of comments associated with the media content. The data store of comments may be locally stored and/or accessed over a network. Some or all of the comments may be associated with particular time codes or other selected points during the playback of the media content. The comments may include text and/or other content. In certain examples, one or more comments may include recorded audio, video, hyperlinks, animated content, and/or other content. As described previously, some comments may even include software functionality, such as applications or applets that may be invoked when the comments are viewed. For instance, a comment may include executable code such that when the comment is viewed, the code is executed to display an interactive activity to the viewer.

In additional or alternative examples, the comment(s) received at the comment receiving module 905 may be associated with one or more existing comments to allow a viewer of the comments to move through a daisy chain or other linked organization of comments, as described previously. Thus, when a comment is received at the comment receiving module 905, the output device 125-*e* may be further configured to receive a selection of a second comment from the user for association with the first comment.

The comment indication module 915 may be configured to monitor the display of the echo version of the media content and the flow of incoming comments. For each incoming comment associated with a point in the media content, the comment indication module 915 may cause the display module to display an indicator (e.g., indicator 620 of FIG. 6B) for that comment when a current point in the display of the echo version corresponds to the point in the media content with which the comment is associated.

Figure 10:
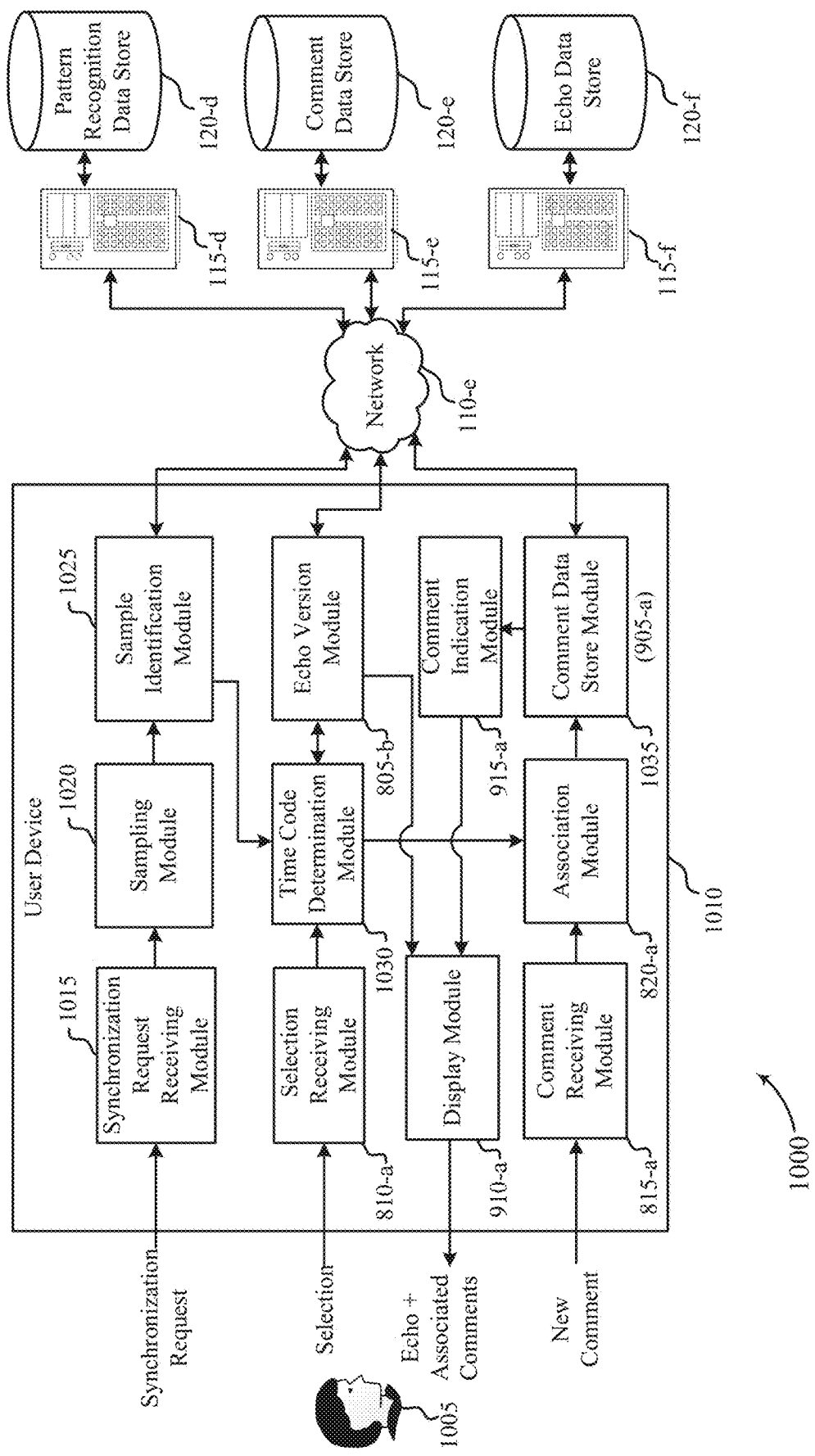
FIG. 10 is a block diagram of an example system including components configured according to various embodiments of the invention.

Referring next to FIG. 10, an example of a system 1000 is shown. In the system 1000 of FIG. 10, a user 1005 utilizes a user device 1010 to view an echo version of media content being played back separately at another device or another portion of the user device 1010. The user device 1010 may further allow the user 1005 to view comments associated with a current point in the echo version of the media content, generate comments with respect to selected portions of the echo version of the media content, and synchronize the echo version of the media content with the playback of the media content occurring at a different device or a different portion of the user device 1010.

The system 1000 of the present example includes the user device 1010, a network 110-*e*, a pattern recognition server 115-*d*, a pattern recognition data store 120-*d*, a comment server 115-*e*, a comment data store 120-*e*, an echo data server 115-*f*, and an echo data store. Each of these components may be in communication, directly or indirectly.

The system 800 may be an example of the system 100 described above with respect to FIG. 1, the system 400 described above with respect to FIG. 4, the system 500 described above with respect to FIG. 5, and/or the system 700 described above with reference to FIG. 7.

The network 110-*e* may be an example of the network 110 described above with reference to FIG. 1, 4, or 7. The pattern recognition server 115-*d*, the comment server 115-*e*, and the media content server 115-*f* may be examples of the central server computer system 115 described above with reference to FIG. 1 or 4. The pattern recognition data store 120-*d*, the comment data store 120-*e*, and the media content data store 120-*f* may be examples of the data store 120 described above with respect to FIG. 1 or FIG. 4.

The user device 1010 of the present example may perform the functionality of both an input device 105 and an output device 125. As such, the user device 1010 may be an example of the input device 105 described above with reference to FIG. 1, FIG. 4, FIG. 7, or FIG. 8, the set top box 510 described above with reference to FIG. 5, and/or the output device 125 described above with reference to FIG. 1 or FIG. 8.

Similar to the input device 105-*j* of FIG. 7, the user device 1010 of the present example includes an echo version module 805-*b* for generating an echo version of the separate playback of the media content, a selection receiving module 810-*a* for receiving a selection of a portion of the echo version for insertion of a comment, a comment receiving module 815-*a* for receiving a comment from the user 1005, and an association module 820-*a* for associating the received comment with a portion of the media content associated with the selected portion of the parallel echo version of the media content. The echo version module 805-*b* may generate the echo version of the media content from echo data received over the network 110-*e* from the echo data store 120-*f* via the echo data server 115-*f*. In certain examples, the echo data store 120-*f* does not store the media content itself, only the data for generating an echo version of the media content. The echo version of the media content generated by the echo version module 805-*b* may be output to a display module 910-*a* for display to the user 1005.

To associate a new comment with the media content, the user 1005 may indicate a selected portion of the echo version of the media content to the selection receiving module 810-*a*. A time code determination module 1030 may determine a time code corresponding to a current point in the echo version of the media content or to some other point in the echo version of the media content selected by the user 1005. The new comment entered by the user may be received by the comment receiving module 815-*a*. The association module 820-*a* may associate a portion of the media content associated with the selected portion of the echo version with the new comment. A comment data store module 1035 may communicate with the comment server 115-*e* over the network 110-*e* to store the comment and the association between the comment and the relevant portion of the media comment in the comment data store 120-*e*.

In additional or alternative examples, the comment server 115-*e* may perform the functionality of associating the portion of the media content associated with the selected portion of the echo version with the new comment. For example, the comment server 115-*e* may receive from the comment data store module 1035 a selected time code for the echo version and the new comment. The comment server 115-*e* may determine that the selected time code for the echo version corresponds to a second time code for the media content. The comment server 115-*e* may then associate the comment with the second time code in the comment data store 120-*e*.

Similar to the output device 125-*e* of FIG. 9, the user device 1010 of the present example includes the comment data store module 1035, which may be an example of the comment receiving module 905 of FIG. 9 for receiving comments associated with a current point in the echo version of the media content. As with other embodiments, the comments may be received over the network 110-*e* from the comment server 115-*e* and/or from local storage in the user device 1010. In additional similarity to the output device 125-*e* of FIG. 9, the user device 1010 may further include the echo version module 805-*b* for generating the parallel echo version of the media content being played on a separate device or separate portion of the user device 1010, the display module 910-*a* for displaying the echo version of the media content to the user 1005, and a comment indication module 915-*a* for monitoring incoming comments and causing the display module 910-*a* to display an indicator for a number of received comments that are relevant to the current point in the echo version. The indicator(s) may overlay the echo version displayed at the display module 910-*a*.

The user device 1010 may further include a synchronization request receiving module 1015, a sampling module 1020, a sample identification module 1025, and a time code determination module 1030 for synchronizing the echo version of the media content displayed at the user device 1010 with the playback of the media content at a separate device or separate portion of the user device 1010.

In one example, the user 1005 may request synchronization of the echo version by tapping or clicking on a button displayed by the user device 1010, or through some other indication. The synchronization request receiving module 1015 may receive the synchronization request A sampling module 1020 may obtain a sample of a portion of the playback of the media content on the separate device or separate portion of the user device 1010. The sample may be obtained by recording audio and/or video from the playback of the media content at a sampling point during the playback of the media content.

The sample identification module 1025 may transmit the sample to the pattern recognition server 115-*d*. The pattern recognition server 115-*d* may search the pattern recognition data store 120-*d* for an entry matching the received sample and return a time code associated with the sampling point. This time code may be returned to the sample identification module 1025. The sample identification module 1025 may forward the time code associated with the sampling point to the time code determination module 1030, which may determine a current point in the playback of the media content by the separate device or separate portion of the user device 1010. The current point in the playback of the media content may be determined by adjusting the time code associated with the sampling point by an offset between the sampling point and a current time. The time code determination module 1030 may cause the echo version module 805-*b* to synchronize to the determined current point in the playback of the media content.

Figure 11:
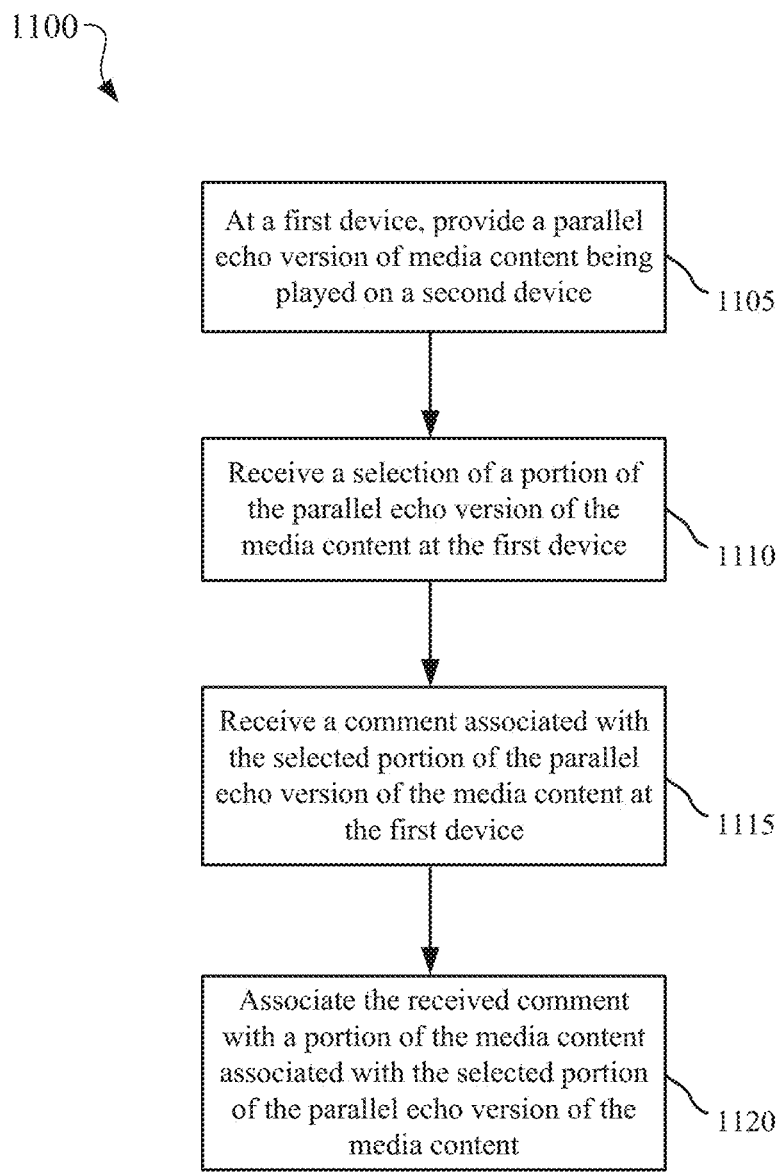
FIG. 11 is a flowchart diagram of an example method of associating comments with playback of media content according to various embodiments of the invention.

Referring next to FIG. 11, flowchart of an example method 1100 of associating comments with playback of media content is shown. The method 1100 may be performed, for example, by the input device 105 described above with respect to FIG. 1, 4, 6, 7, or 8, the central server computer system 115 described above with reference to FIG. 1 or 4, the set-top box 510 described above with respect to FIG. 5, and/or the user device 1010 described above with respect to FIG. 10.

At block 1105, a parallel echo version is provided at a first device of media content being played on a second device. At block 1110, a selection of a portion of the parallel echo version of the media content is received at the first device. At block 1115, a comment associated with the selected portion of the parallel echo version of the media content is received at the first device. At block 1120, the received comment is associated with a portion of the media content associated with the selected portion of the parallel echo version of the media content.

Figure 12:
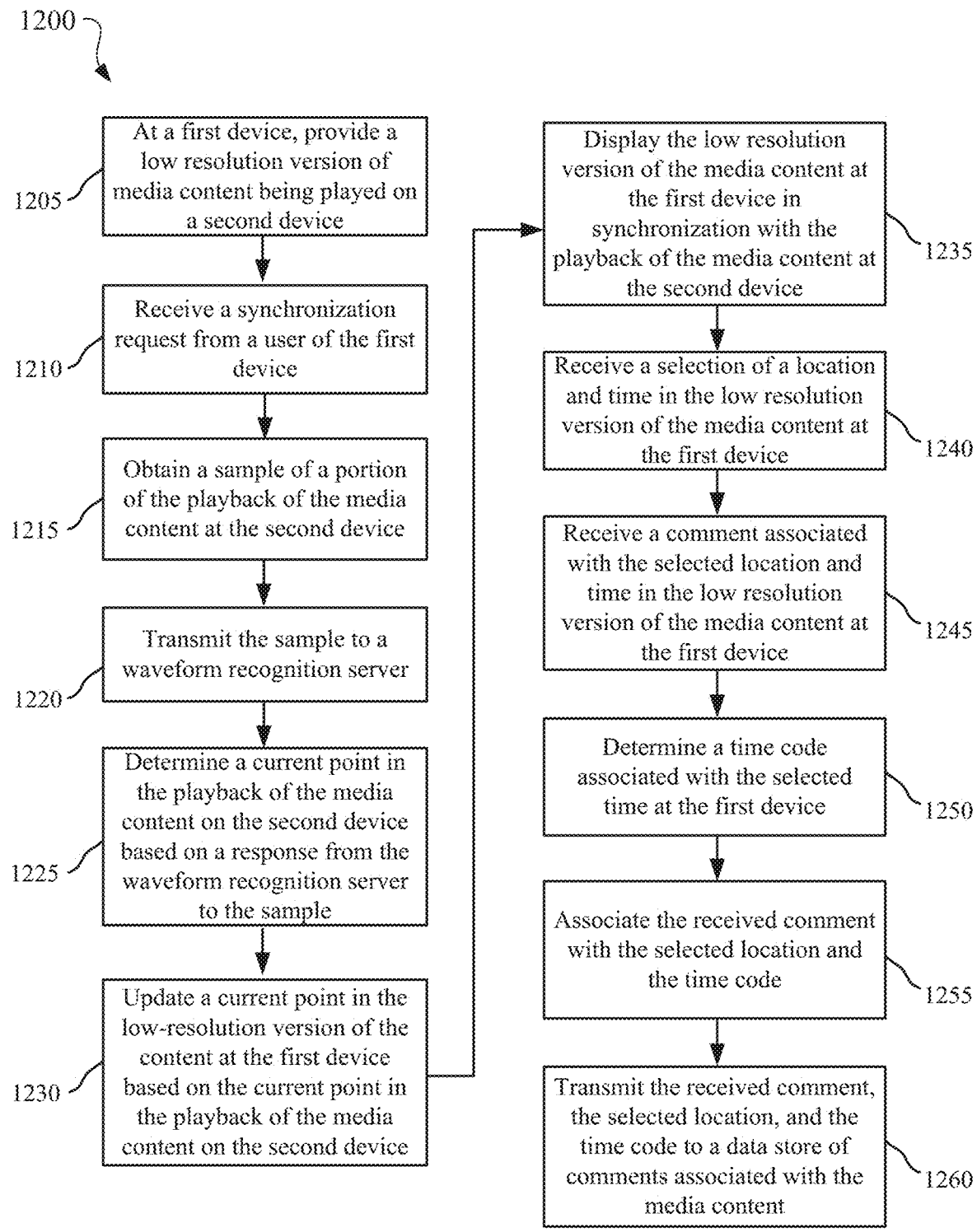
FIG. 12 is a flowchart diagram of an example method of associating comments with playback of media content according to various embodiments of the invention.

Referring next to FIG. 12, flowchart of an example method 1200 of associating comments with playback of media content is shown. The method 1200 may be performed, for example, by the input device 105 described above with respect to FIG. 1, 4, 6, 7, or 8, the central server computer system 115 described above with reference to FIG. 1 or 4, the set-top box 510 described above with respect to FIG. 5, and/or the user device 1010 described above with respect to FIG. 10.

At block 1205, a low resolution version of media content being played on a second device is provided at a first device. The low resolution version of the media content may be a parallel echo version of the media content played on the second device. At block 1210, a synchronization request is received from a user of the first device. At block 1215, a sample of a portion of the playback of the media content at the second device is obtained. At block 1220, the sample is transmitted to a pattern recognition server. At block 1225, a current point in the playback of the media content on the second device is determined based on a response from the pattern recognition server to the transmitted sample. At block 1230, a current point in the low-resolution version of the content provided at the first device is updated based on the determined current point in the playback of the media content on the second device. At block 1235, the first device displays the low resolution version of the media content in synchronization with the playback of the media content at the second device.

At block 1240, a selection of a location and time in the low resolution version of the media content is received at the first device. At block 1245, a comment associated with the selected location and time in the low resolution version of the media content is received at the first device. At block 1250, a time code associated with the selected time is determined at the first device. At block 1255, the received comment and selected location are associated with the determined time code. At block 1260, the received comment, selected location, and time code are transmitted to a data store of comments associated with the media content.

Figure 13:
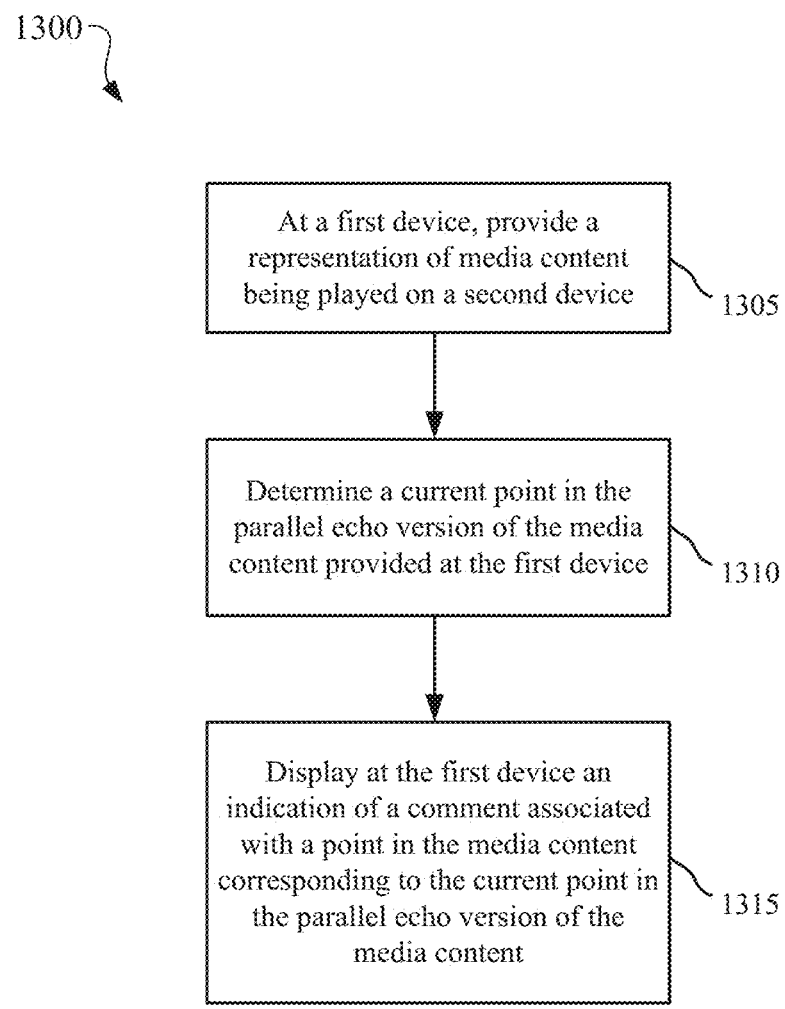
FIG. 13 is a flowchart diagram of an example method of associating comments with playback of media content according to various embodiments of the invention.

Referring next to FIG. 13, flowchart of another example method 1300 of associating comments with playback of media content is shown. The method 1300 may be performed, for example, by the output device 125 described above with respect to FIG. 1, 9, or 10, the central server computer system 115 described above with reference to FIG. 1 or 4, and/or by the set-top box 510 described above with respect to FIG. 5.

At block 1305, a parallel echo version of media content being played on a second device is provided at a first device. At block 1310, a current point in the parallel echo version of the media content provided at the first device is determined. At block 1315, an indicator is displayed at the first device of a comment associated with a point in the media content corresponding to the current point in the parallel echo version of the media content provided at the first device.

Figure 14:
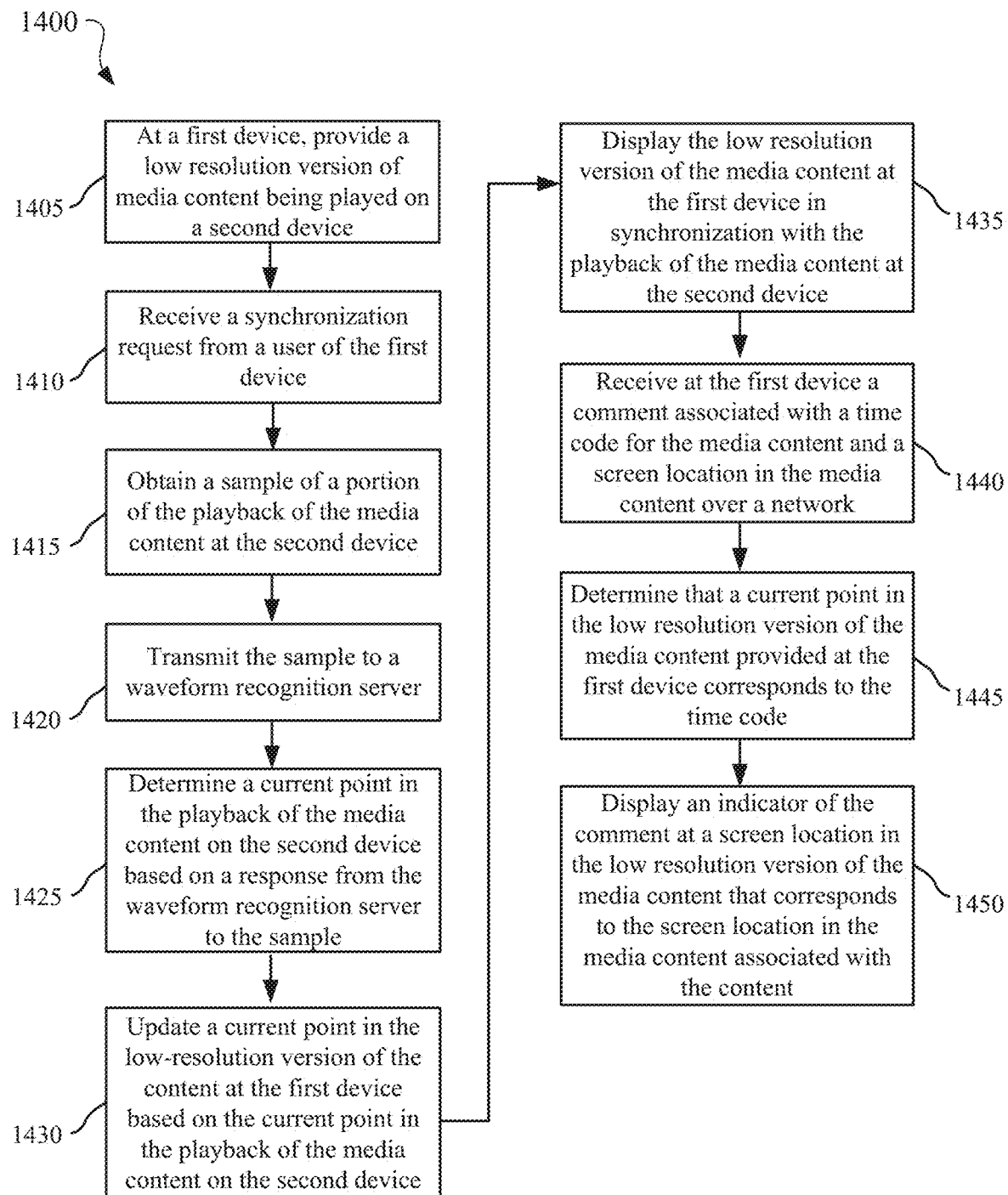
FIG. 14 is a flowchart diagram of an example method of associating comments with playback of media content according to various embodiments of the invention.

Referring next to FIG. 14, flowchart of another example method 1400 of associating comments with playback of media content is shown. The method 1400 may be performed, for example, by the output device 125 described above with respect to FIG. 1, 9, or 10, the central server computer system 115 described above with reference to FIG. 1 or 4, and/or by the set-top box 510 described above with respect to FIG. 5.

At block 1405, a low resolution version of media content being played on a second device is provided at a first device. The low resolution version of the media content may be a parallel echo version of the media content played on the second device. At block 1410, a synchronization request is received from a user of the first device. At block 1415, a sample of a portion of the playback of the media content at the second device is obtained. At block 1420, the sample is transmitted to a pattern recognition server. At block 1425, a current point in the playback of the media content on the second device is determined based on a response from the pattern recognition server to the transmitted sample. At block 1430, a current point in the low-resolution version of the content provided at the first device is updated based on the determined current point in the playback of the media content on the second device. At block 1435, the first device displays the low resolution version of the media content in synchronization with the playback of the media content at the second device.

At block 1440, the first device receives a comment associated with a time code for the media content and a screen location in the media content over a network. At block 1445, a determination is made that a current point in the low resolution version of the media content provided at the first device corresponds to the time code. At block 1450, an indicator of the comment is displayed at a screen location in the low resolution version of the media content that corresponds to the screen location in the media content associated with the content.

Figure 15:
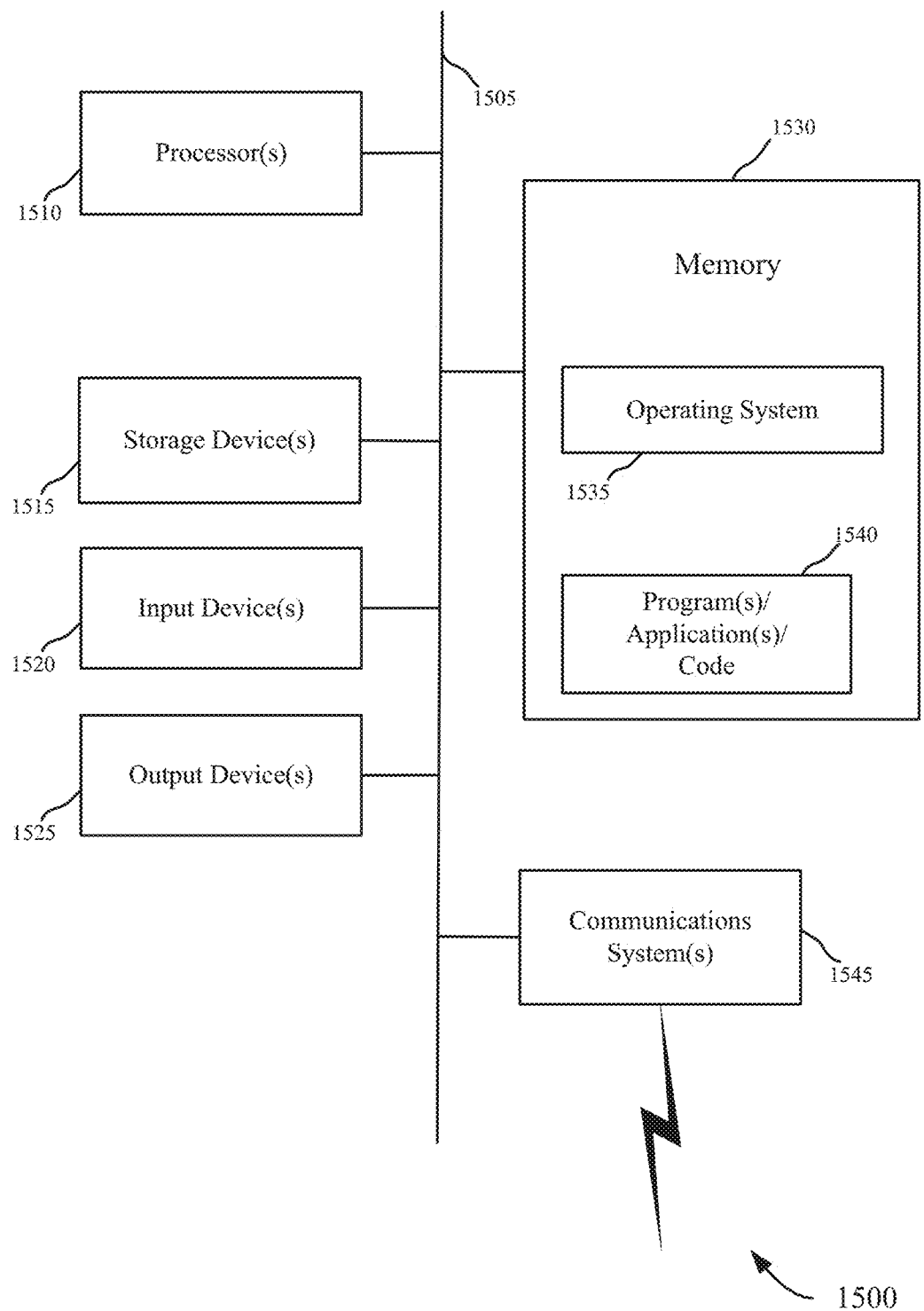
FIG. 15 is a schematic diagram that illustrates a representative device structure that may be used in various embodiments of the present invention.

A device structure 1500 that may be used for one or more input devices 105, the central server computer system 115, for one or more set-top boxes 510, for one or more output devices 125, or for other computing devices described herein, is illustrated with the schematic diagram of FIG. 15. This drawing broadly illustrates how individual system elements of each of the aforementioned devices may be implemented, whether in a separated or more integrated manner. Thus, any or all of the various components of one of the aforementioned devices may be combined in a single unit or separately maintained and can further be distributed in multiple groupings or physical units or across multiple locations. The example structure shown is made up of hardware elements that are electrically coupled via bus 1505, including processor(s) 1510 (which may further comprise a DSP or special-purpose processor), storage device(s) 1515, input device(s) 1520, and output device(s) 1525. The storage device(s) 1515 may be a machine-readable storage media reader connected to any machine-readable storage medium, the combination comprehensively representing remote, local, fixed, or removable storage devices or storage media for temporarily or more permanently containing computer-readable information. The communications system(s) interface 1545 may interface to a wired, wireless, or other type of interfacing connection that permits data to be exchanged with other devices. The communications system(s) interface 1545 may permit data to be exchanged with a network.

The structure 1500 may also include additional software elements, shown as being currently located within working memory 1530, including an operating system 1535 and other code 1540, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method of associating comments with playback of media content, the method comprising:
    recording, using a camera or microphone at a first device, an audio or visual sample of a first version of media content being played on a second device, wherein the first version of the media content comprises a plurality of visual elements;
    obtaining, at the first device, a second version of the media content based on the audio or visual sample, wherein the second version of the media content comprises:
        a subset of the plurality of visual elements, and
        at least one other visual element in place of at least one corresponding visual element of the plurality of visual elements, wherein the at least one corresponding visual element included in the first version of the media content comprises a plurality of visual objects having outlines, a first set of features within the outlines, and a second set of features within the outlines, and wherein the at least one other visual element included in the second version of the media content is a downgraded version of the at least one corresponding visual element included in the first version, the at least one other visual element consisting of the outlines of the plurality of visual objects and the first set of features;
    receiving, at the first device, a selection of a point within or a portion of the second version of the media content;
    receiving, at the first device, a comment associated with the selected point within or the selected portion of the second version of the media content; and
    associating the received comment with a point within or a portion of the first version of the media content corresponding to the selected point within or the selected portion of the second version of the media content.

2. The method of claim 1, wherein associating the received comment with the point within or the portion of the first version of the media content comprises:
    attaching the point within or the portion of the second version of the media content to the received comment; and
    transmitting the comment and the attached point within or the portion of the second version of the media content to a pattern recognition server.

3. The method of claim 2, wherein the attached point within or the attached portion of the second version of the media content is used to determine a time code associated with the comment or is used as a reference by subsequent users, or both.

4. The method of claim 1, wherein the comment comprises executable code that controls subsequent playback or characteristics of the first version of the media content at other devices.

5. The method of claim 1, wherein obtaining the second version of the media content comprises:
generating, by the first device, the second version of the media content based on the recorded audio or visual sample; or
receiving the second version of the media content from the second device.

6. The method of claim 1, further comprising:
displaying, at the first device, the second version of the media content.

7. The method of claim 6, wherein receiving the selection of the point within or the portion of the second version of the media content comprises receiving a selection of one or more points during the display of the second version of the media content, wherein the display of the comment during subsequent playback of the media content at other devices is associated with the display of the second version of the media content at the other devices.

8. The method of claim 6, further comprising:
receiving, at the first device, a synchronization request;
obtaining a sample of another point within or another portion of the first version of the media content being played on the second device based on receiving the synchronization request;
determining a current point in the playback of the first version of the media content based on the obtained sample of the other point within or the other portion of the second version of the media content; and
synchronizing the display of the second version of the media content at the first device with the playback of the first version of the media content on the second device, wherein the synchronizing comprises updating another current point in the display of the second version of the media content at the first device based on the determined current point in the playback of the first version of the media content on the second device.

9. The method of claim 1, further comprising:
transmitting the second version of the media content to a pattern recognition server.

10. A non-transitory computer readable medium storing computer-executable code for associating comments with playback of media content at a first device, the code executable by a processor to:
record, using a camera or microphone at the first device, an audio or visual sample of a first version of media content being played on a second device, wherein the first version of the media content comprises a plurality of visual elements;
obtain, at the first device, a second version of the media content based on the audio or visual sample, wherein the second version of the media content comprises:
a subset of the plurality of visual elements, and
at least one other visual element in place of at least one corresponding visual element of the plurality of visual elements, wherein the at least one corresponding visual element included in the first version of the media content comprises a plurality of visual objects having outlines, a first set of features within the outlines, and a second set of features within the outlines, and wherein the at least one other visual element included in the second version of the media content is a downgraded version of the at least one corresponding visual element included in the first version, the at least one other visual element consisting of the outlines of the plurality of visual objects and the first set of features;
receive, at the first device, a selection of a point within or a portion of the second version of the media content;
receive, at the first device, a comment associated with the selected point within or the selected portion of the second version of the media content; and
associate the received comment with a point within or the portion of the first version of the media content corresponding to the selected point within or the selected portion of the second version of the media content.

11. The non-transitory computer readable medium of claim 10, wherein the code is executable by the processor to:
obtain a sample of the point within or the portion of the playback of the first version of the media content on the second device;
determine a first time code associated with a current point in the playback of the first version of the media content on the second device based on the sample; and
synchronize the display of the second version of the media content at the first device with the playback of the first version of the media content on the second device by updating a second time code at the first device based on the first time code.

12. The non-transitory computer readable medium of claim 11, wherein the code is executable by the processor to:
generate the second version of the media content based on the recorded audio or visual sample.

13. The non-transitory computer readable medium of claim 10, wherein the code is executable by the processor to:
associate the received comment with a time code associated with a second point within the portion of the second version of the media content at the first device.

14. The method of claim 1, wherein
the at least one other visual element included in the second version of the media content consists of the outlines of the plurality of visual objects.

15. A method of associating comments with playback of media content, the method comprising:
recording, using a camera or microphone at a first device, an audio or visual sample of a first version of media content being played on a second device, wherein the first version of the media content comprises a plurality of visual elements;
obtaining, at the first device, a second version of the media content based on the audio or visual sample, wherein the second version of the media content comprises:
a subset of the plurality of visual elements, and
at least one other visual element in place of at least one corresponding visual element of the plurality of visual elements, wherein the at least one corresponding visual element included in the first version of the media content comprises a plurality of visual objects having outlines, a first set of features within the outlines, and a second set of features within the outlines, and wherein the at least one other visual element included in the second version of the media content is a downgraded version of the at least one corresponding visual element included in the first version, the at least one other visual element consisting of the outlines of the plurality of visual objects and the first set of features;
determining, at the first device, a current point in the second version of the media content; and displaying, at the first device, a comment or an indicator of the comment associated with a point in the first version of the media content corresponding to the current point in the second version of the media content provided at the first device.

16. The method of claim 15, wherein obtaining the second version of the media content comprises receiving the second version of the media content from the second device, the method further comprising:

receiving, at the first device, the comment associated with the current point in the playback of the first version of the media content on the second device from a data store over a network.

17. The method of claim 16, wherein the comment comprises an attached point within or an attached portion of the second version of the media content, wherein the attached point within or the attached portion is used as a reference for subsequent comments or is used to assist in synchronization of the display of the second version of the media content at the first device with the display of the first version of the media content at the second device.

18. The method of claim 15, further comprising:

determining a screen location in the second version of the media content associated with the comment, wherein displaying the indicator of the comment at the first device comprises displaying the indicator of the comment at the screen location based at least in part on the determining.

* * * * *